United States Patent [19]

Takahashi

[11] Patent Number: 5,059,883
[45] Date of Patent: Oct. 22, 1991

[54] METHOD AND APPARATUS FOR DRIVING STEPPING MOTOR

[75] Inventor: Masaki Takahashi, Yokohama, Japan

[73] Assignee: Kabushiki Kaisha Toshiba, Kawasaki, Japan

[21] Appl. No.: 534,280

[22] Filed: Jun. 7, 1990

[30] Foreign Application Priority Data

Jun. 29, 1989 [JP] Japan .................................. 1-168141
Sep. 20, 1989 [JP] Japan .................................. 1-244611

[51] Int. Cl.$^5$ ............................................. H02P 8/00
[52] U.S. Cl. ...................................... 318/696; 318/685
[58] Field of Search ............................ 318/696, 685

[56] References Cited

U.S. PATENT DOCUMENTS

| | | | |
|---|---|---|---|
| 4,081,736 | 3/1978 | Leenhouts | 318/696 |
| 4,091,316 | 5/1978 | Friedman | 318/685 |
| 4,219,767 | 8/1980 | Wimmer | 318/696 |
| 4,220,904 | 9/1980 | Leenhouts et al. | 318/696 |
| 4,540,928 | 9/1985 | Marhoefer | 318/696 |
| 4,673,855 | 6/1987 | Boillst | 318/696 |
| 4,683,409 | 7/1987 | Boillst | 318/685 |

Primary Examiner—William M. Shoop, Jr.
Assistant Examiner—Saul M. Bergmann
Attorney, Agent, or Firm—Oblon, Spivak, McClelland, Maier & Neustadt

[57] ABSTRACT

A drive apparatus is disclosed which is designed to switch/excite a plurality of excitation windings of a stepping motor in a predetermined order. Periodic velocity fluctuation data of the stepping motor is stored in a memory unit in advance. An arithmetic unit reads out the velocity fluctuation data stored in the memory unit. The arithmetic unit outputs a pulse train whose pulse rate fluctuates to have a phase opposite to that of velocity fluctuation obtained from the velocity fluctuation data. This pulse train is used as switching timing signals for switching/exciting the plurality of excitation windings in a predetermined order.

21 Claims, 26 Drawing Sheets

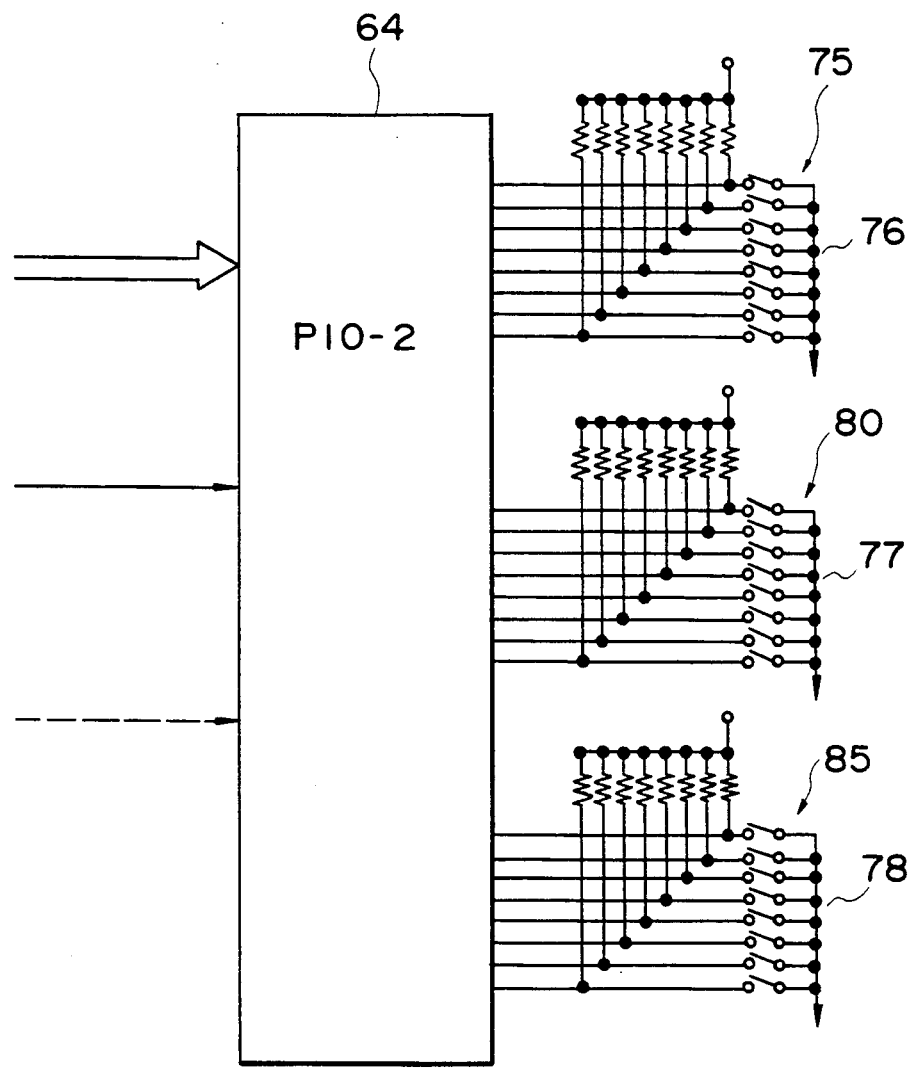
F I G. 7

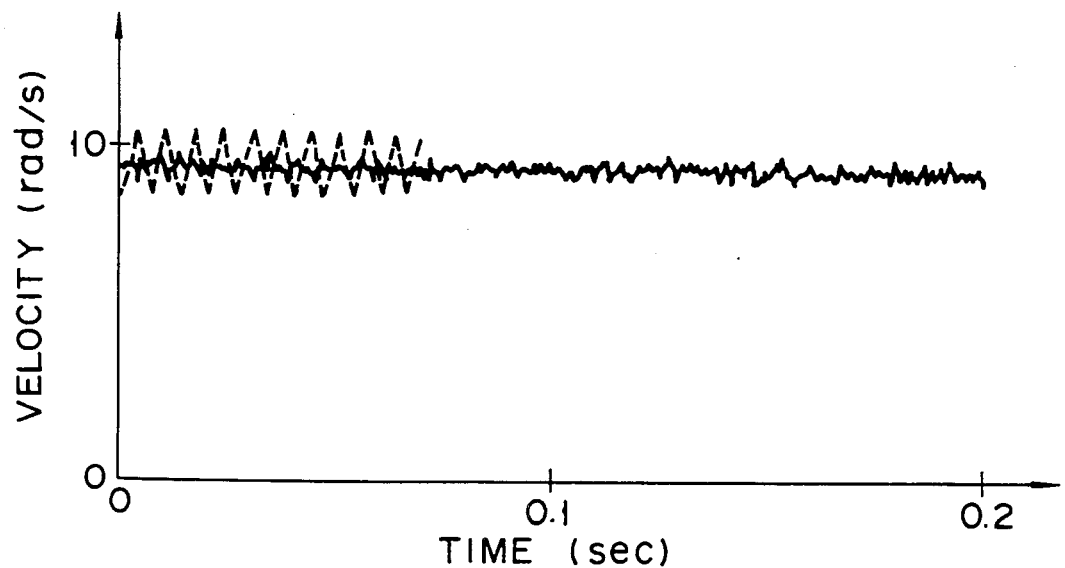
F I G. 9
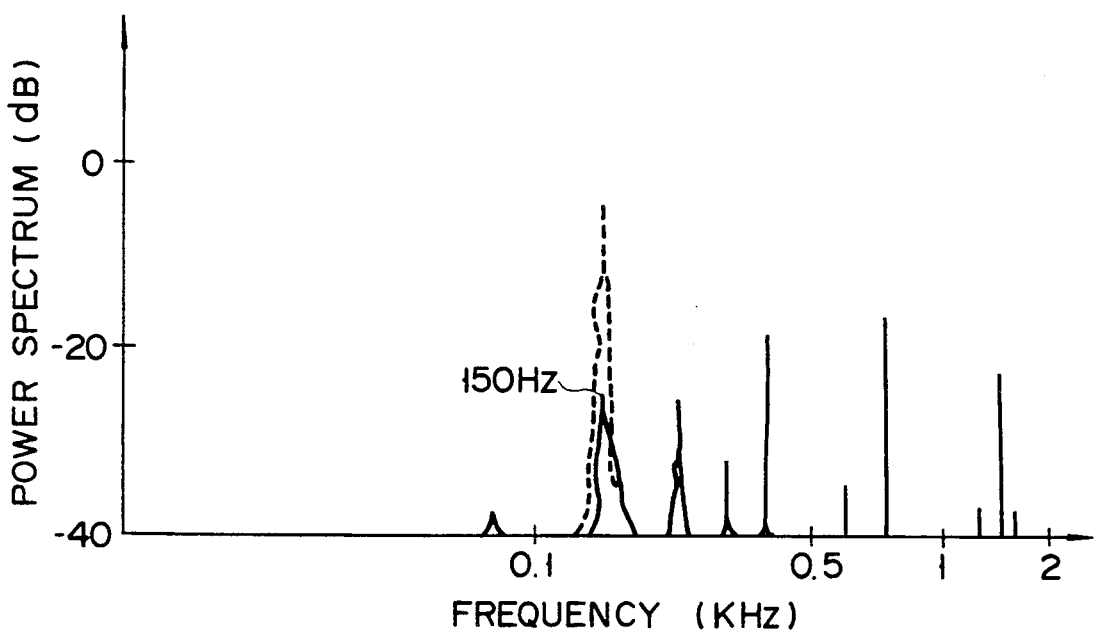
F I G. 10

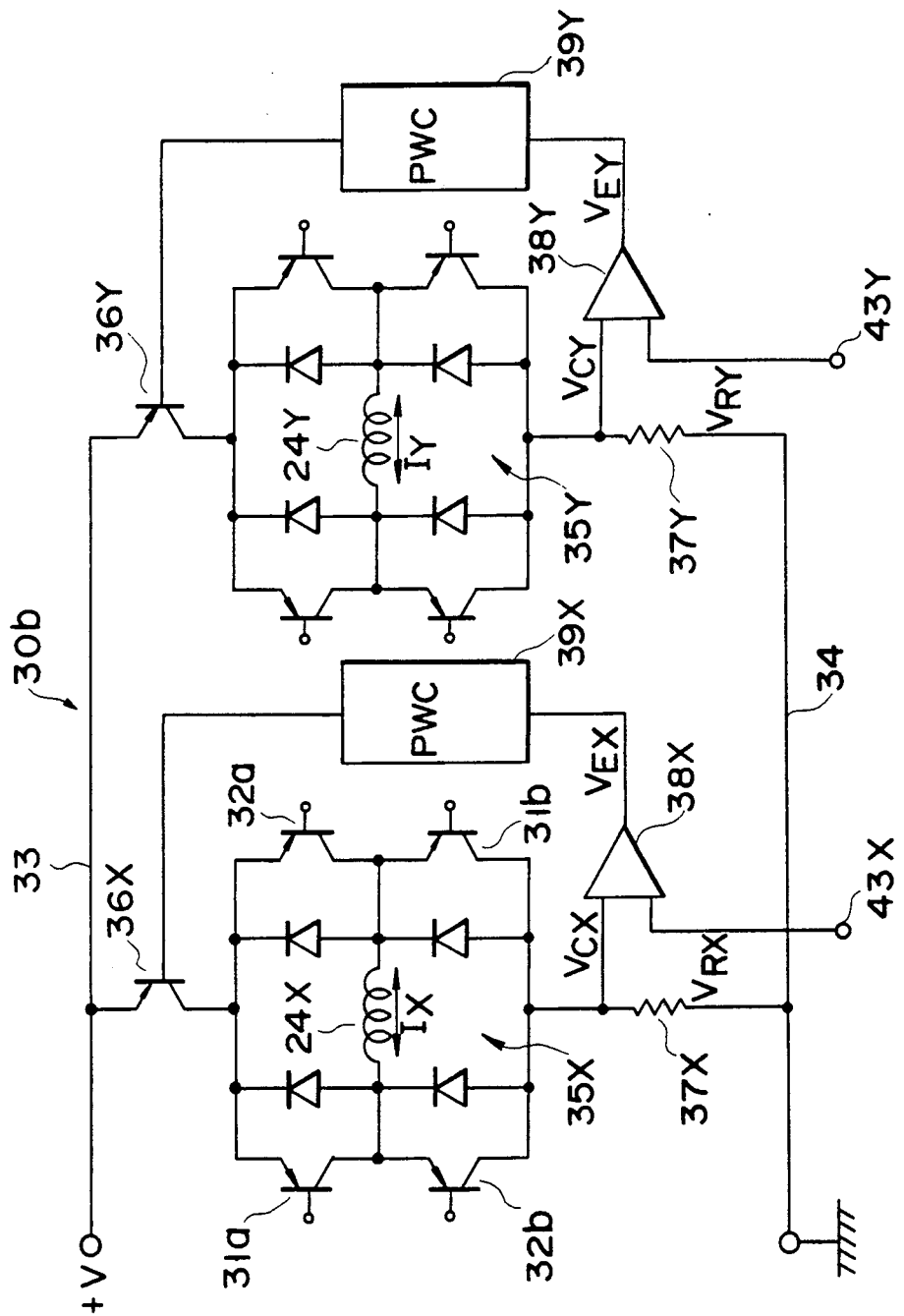
F I G. 15

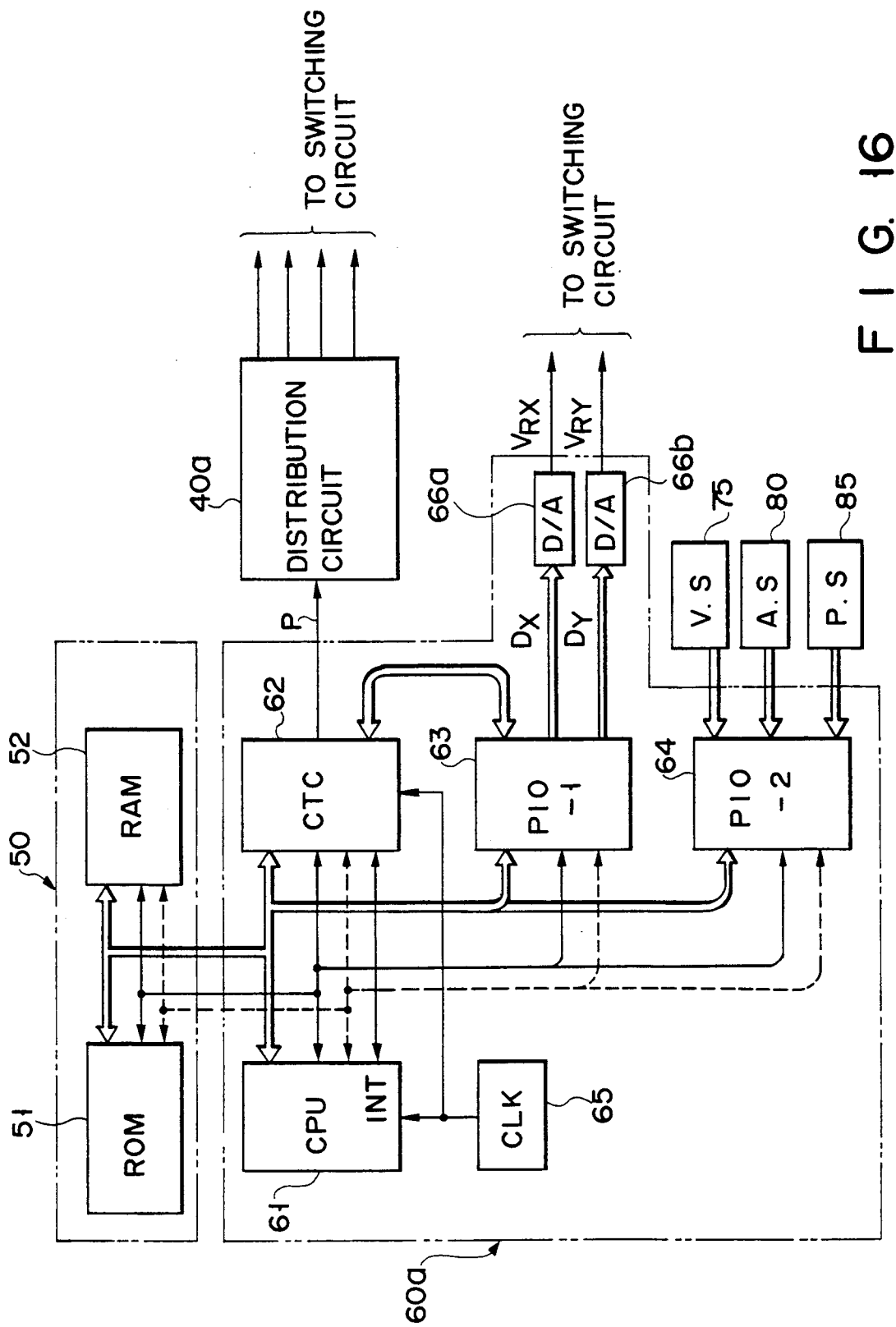
F I G. 16

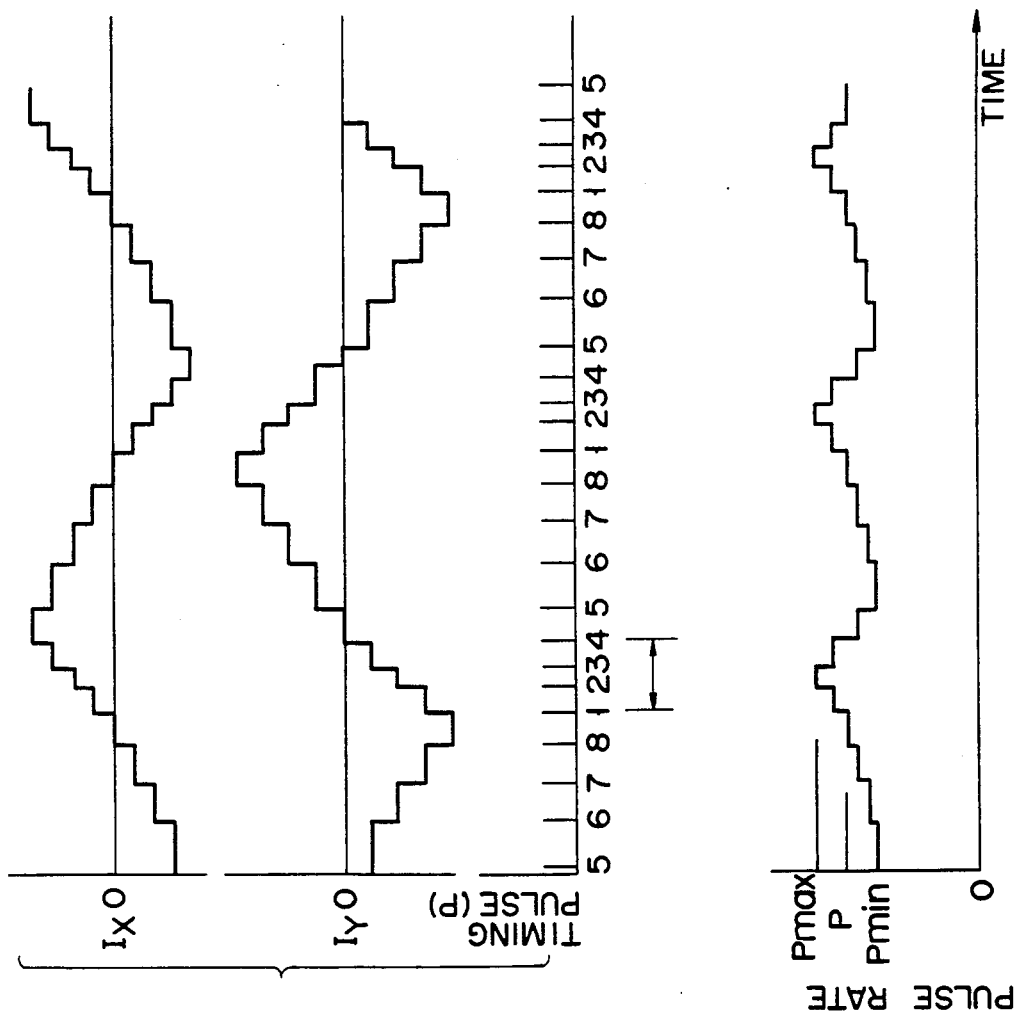
F I G. 17A
F I G. 17B

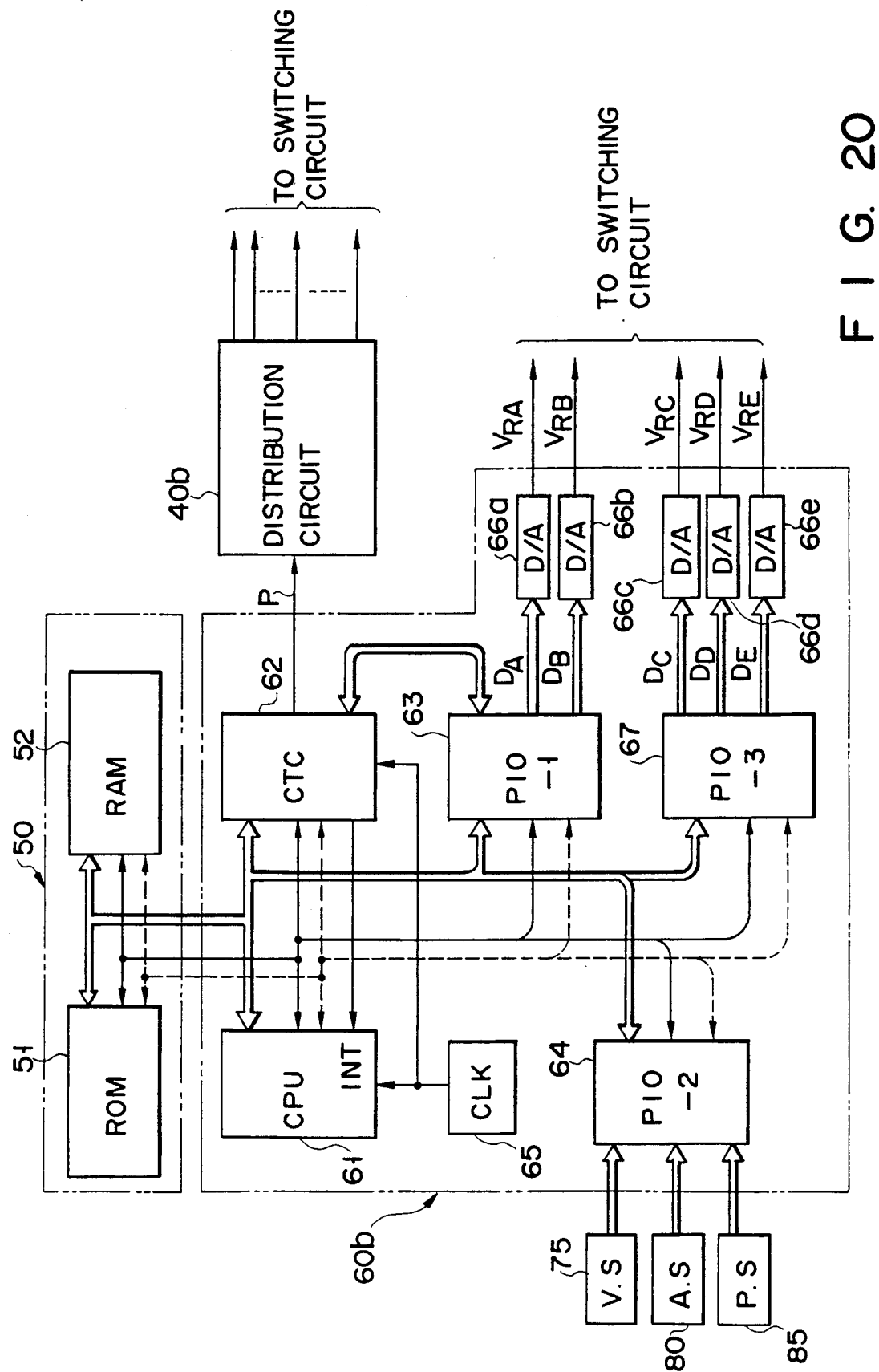

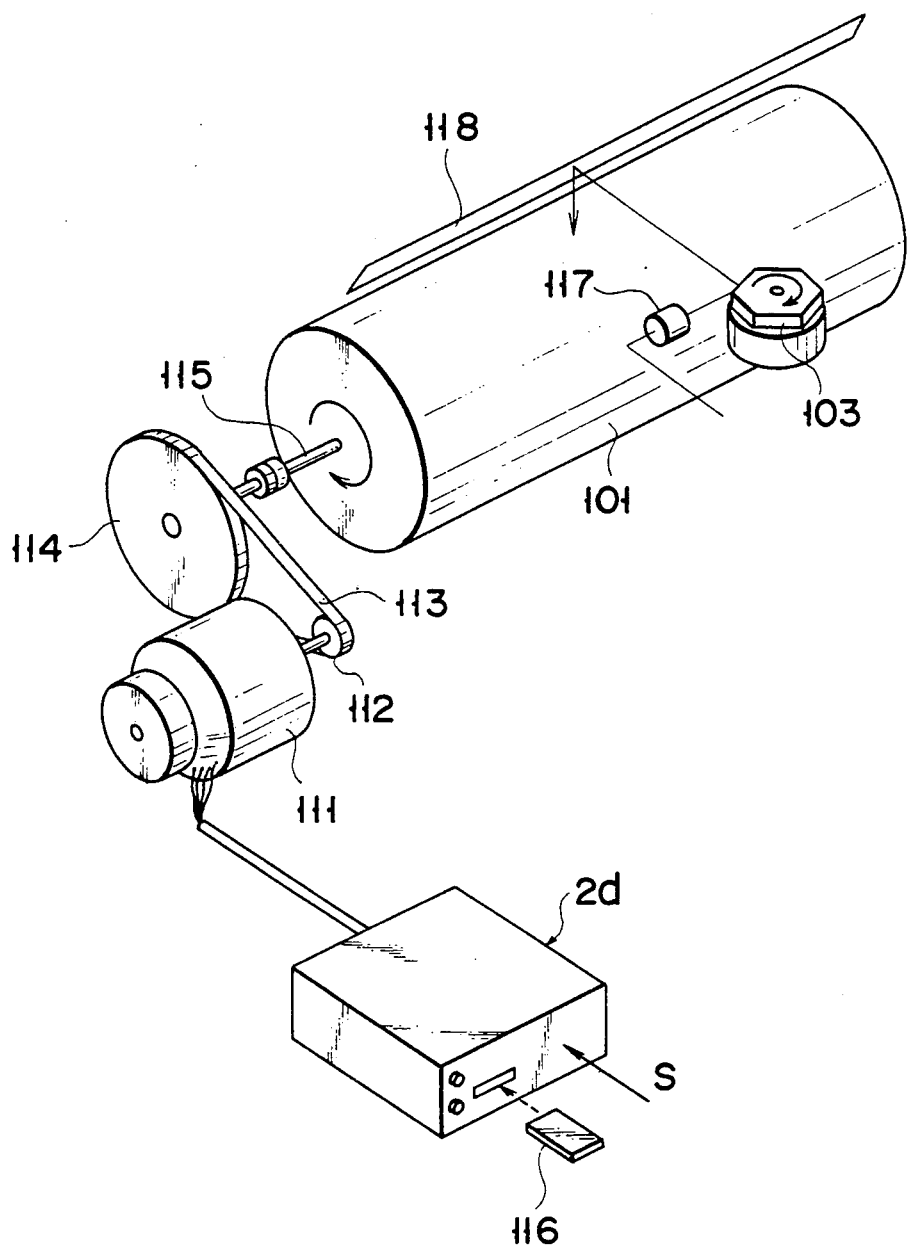
F I G. 23

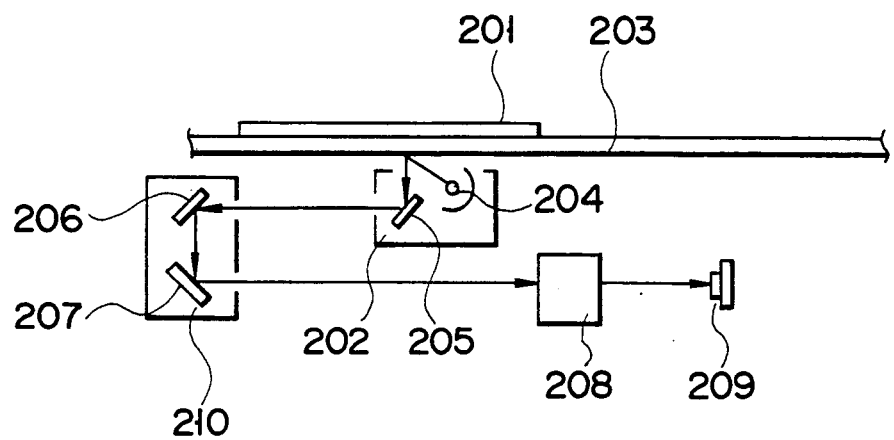
F I G. 25
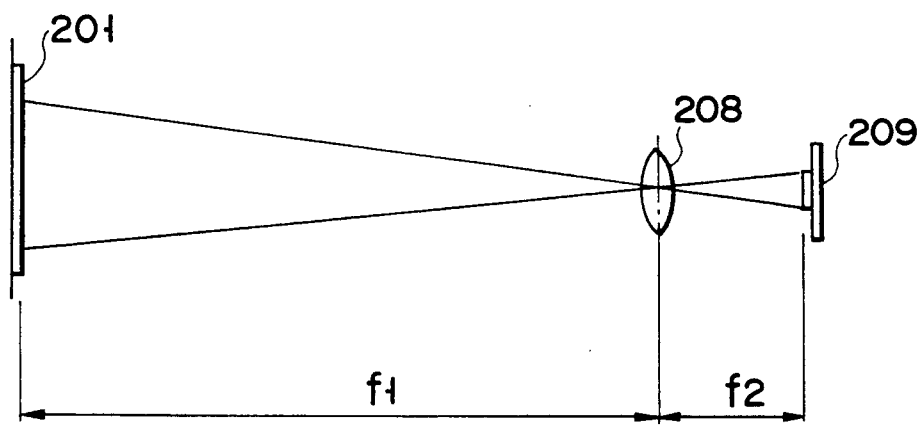
F I G. 26

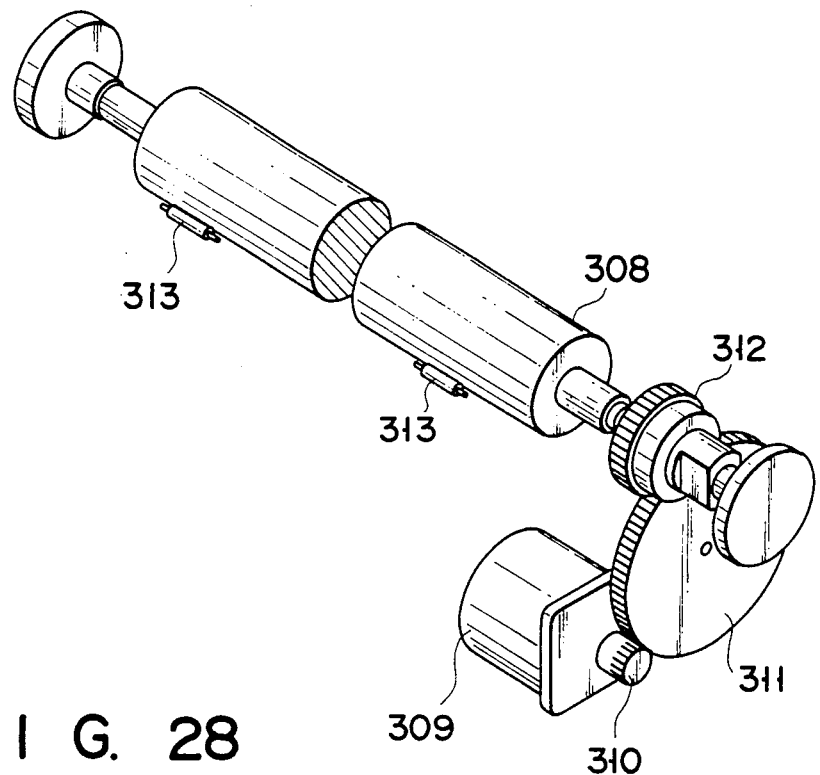
F I G. 28
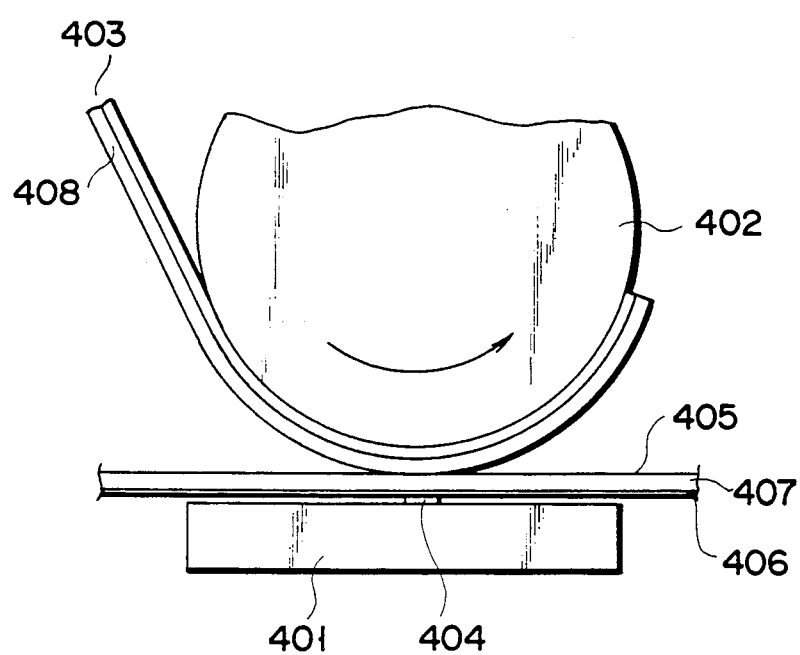
F I G. 29

METHOD AND APPARATUS FOR DRIVING STEPPING MOTOR

BACKGROUND OF THE INVENTION

1. Field of the Invention

The present invention relates to a method and apparatus for driving a stepping motor.

2. Description of the Related Art

As is known, stepping motors are driven by open-loop control using digital signals. In stepping motors, satisfactory positioning precision can be obtained even by open-loop control. For this reason, stepping motors are used in a variety of fields including the field of a printer.

A typical stepping motor comprises a rotatable rotor, and a stator core arranged around the rotor. A plurality of small teeth are formed at an equal pitch on the outer surface of the rotor. Stator poles of a number corresponding to the number of phases are formed on the inner surface of the stator core. A plurality of small teeth are formed at an equal pitch on the distal end portion of each stator pole. Excitation winding are respectively wound around the stator poles. The respective excitation windings are sequentially switched-/excited by a drive apparatus in a predetermined order. When a given excitation winding is excited, an electromagnetic attracting or repulsing force acts between corresponding stator-side small teeth and corresponding rotor-side small teeth. As a result, a stepping operation of the rotor is started.

When the stepping motor is rotated at low velocity, a stepping operation is emphasized, and the rotation velocity of the rotor fluctuates. The period of this rotation velocity fluctuation coincides with the period of an excitation switching frequency. In contrast to this, when the stepping motor is rotated at high velocity, the stepping operation is not emphasized because of degradation of frequency response characteristics. However, the rotation velocity of the rotor fluctuates because of output torque variations between the respective excitation phases. That is, it is difficult to match the conditions of the respective excitation phases with each other in the process of manufacturing a stepping motor. This mismatching causes the rotation velocity of the rotor to fluctuate. For example, when a hybrid five-phase stepping motor is sequentially switched/excited at 1,500 Hz (called a pulse rate of 1,500 pps), a peak level of a velocity fluctuation power spectrum appears at 150 Hz. This frequency corresponds to 1/10 the excitation switching frequency. Such velocity fluctuation is caused by output torque variations between the respective excitation phases.

In a stepping motor, velocity fluctuation occurs every step in a low-velocity rotation range and at a period corresponding to several steps in a high-velocity rotation range in this manner. Such velocity fluctuation is a great drawback of a stepping motor. Especially, when a stepping motor is used as a drive source for a precision machine, required performance cannot often be satisfied because of the above-mentioned velocity fluctuation. In addition, when a stepping motor is incorporated in a practical system and a load has mass unbalance, velocity fluctuation caused by this unbalance is added to the above velocity fluctuation.

In order to reduce the above-mentioned velocity fluctuation, various methods are employed, e.g., a method of mounting a dynamic damper on the shaft of a rotor or a road shaft, a method of inserting a damping material in a torque transmission mechanism, and a method of mounting a large flywheel. If velocity fluctuation cannot be reduced by such mechanical means, the structure of a stepping motor is changed in such a manner that the pitch of the small teeth on the rotor and stator sides is reduced to decrease the amount of movement per step, or the number of excitation phases is increased. In addition, an attempt is made to reduce velocity fluctuation by a so-called microstep drive, in which currents (voltages) to be applied to different excitation phases are increased/decreased in level stepwise so as to shift the stop point of the rotor stepwise.

In the system for reducing velocity fluctuation by means of a mechanical element, however, the overall system is increased in size, and a large velocity fluctuation reducing effect cannot be expected. Similarly, in the microstep drive system, if variations in torque characteristics are present between different excitation phases, a large velocity fluctuation reduction effect cannot be obtained.

SUMMARY OF THE INVENTION

It is an object of the present invention to provide a method and apparatus for driving a stepping motor, which can greatly reduce velocity fluctuation of a rotor with a simple electrical means.

According to a drive method and a drive apparatus of the present invention, when a plurality of excitation windings of a stepping motor are to be sequentially switched/excited in a predetermined order, time intervals in which the respective excitation windings are sequentially switched/excited are caused to periodically fluctuate in correspondence with the intrinsic periodic velocity fluctuation of the stepping motor (or the intrinsic periodic velocity fluctuation of a system including the stepping motor and a load connected thereto).

More specifically, the pulse rate of a pulse train for determining the excitation switching timings of the respective excitation windings is caused to fluctuate so as to have a phase opposite to that of the above-mentioned velocity fluctuation. In this case, in order to cause the time intervals of the excitation switching timings to more finely fluctuate, the microstep drive may be effectively used together with the above-described method.

According to the present invention, the above-mentioned intrinsic velocity fluctuation can be canceled by velocity fluctuation caused upon pulse rate fluctuation. As a result, the rotor can be smoothly rotated.

Additional objects and advantages of the invention will be set forth in the description which follows, and in part will be obvious from the description, or may be learned by practice of the invention. The objects and advantages cf the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a view showing an arrangement of a velocity setting unit, an amplitude setting unit, and a phase setting unit which are incorporated in the drive apparatus in FIG. 1;

FIG. 9 is a graph showing a velocity fluctuation result obtained when a high-velocity rotation range is controlled by the drive apparatus in FIG. 1;

FIG. 10 is a graph showing a velocity fluctuation power spectrum under the condition shown in FIG. 9;

FIG. 15 is a circuit diagram showing an arrangement of a switching circuit incorporated in the drive apparatus in FIG. 14;

FIG. 16 is a block diagram showing an arithmetic unit incorporated in the drive apparatus in FIG. 14;

FIG. 17A is a timing chart showing the levels of currents flowing in the respective excitation windings of a stepping motor to be driven by the drive apparatus in FIG. 14;

FIG. 17B is a graph showing changes in a pulse rate under the condition shown in FIG. 17A;

FIG. 20 is a block diagram showing an arithmetic unit incorporated in the drive apparatus in FIG. 18;

FIG. 23 is a perspective view showing only a photosensitive drum system of the printer in FIG. 22;

FIG. 25 is a view showing an optical system of the image scanner in FIG. 24;

FIG. 26 is an equivalent circuit diagram of the optical system in FIG. 24;

FIG. 28 is a view showing a platen roller drive system of the printer in FIG. 27;

FIG. 29 is a side view showing a main part of a thermal line printer incorporating a drive apparatus of the present invention.

DETAILED DESCRIPTION OF THE PREFERRED EMBODIMENT

Figure 1:
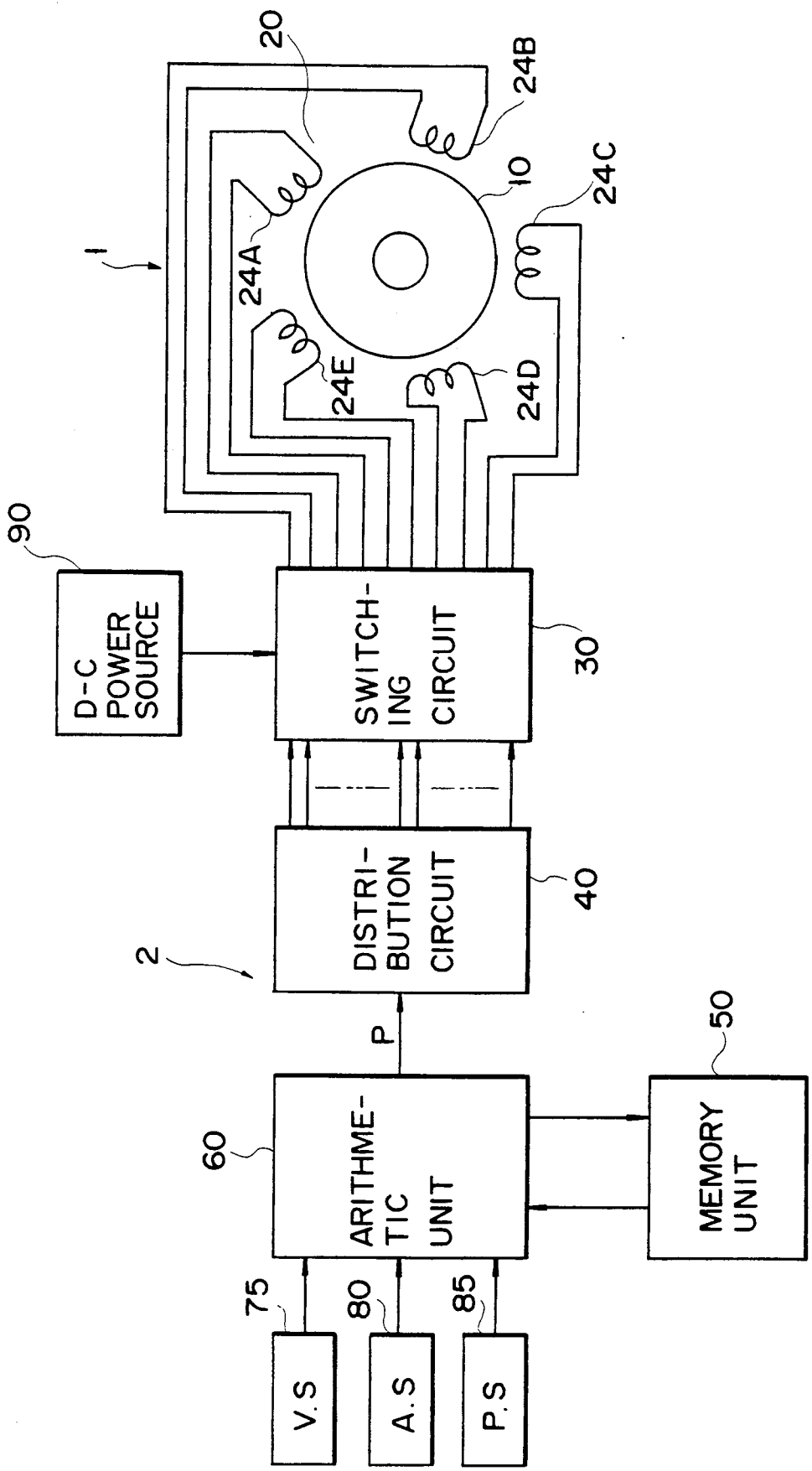
FIG. 1 is a block diagram showing a drive apparatus for a stepping motor according to an embodiment of the present invention.

FIG. 1 is a block diagram showing an arrangement of a drive apparatus to which the present invention i applied.

Referring to FIG. 1, reference numeral 1 denotes a five-phase stepping motor. The stepping motor 1 is driven by a drive apparatus 2.

The stepping motor 1 includes a rotor 10 and a stator 20. The rotor 10 is coupled to a mass-balanced rotating load (not shown).

Figure 2:
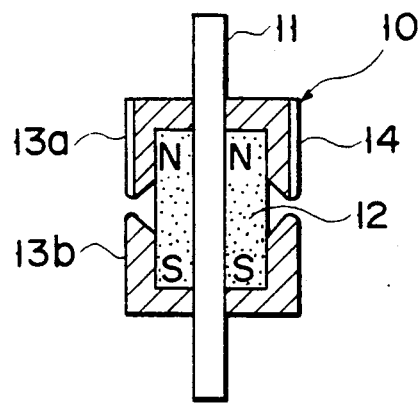
FIG. 2 is a longitudinal sectional view of a rotor of a stepping motor to be driven by the drive apparatus in FIG. 1.

As shown in FIG. 2, the rotor 10 comprises a shaft 11 made of a nonmagnetic material, an axially-magnetized permanent magnet 12 mounted around the shaft 11, and magnetic gear cutting cups 13a and 13b with which both the end portions of the permanent magnet 12 are capped. In this embodiment, 50 small teeth 14 are formed at an equal pitch on each of the gear cutting cups 13a and 13b in the circumferential direction. Note that the small teeth 14 of the gear cutting cups 13a and 13b are arranged to have a phase difference of ½ the pitch in the circumferential direction.

Figure 3:
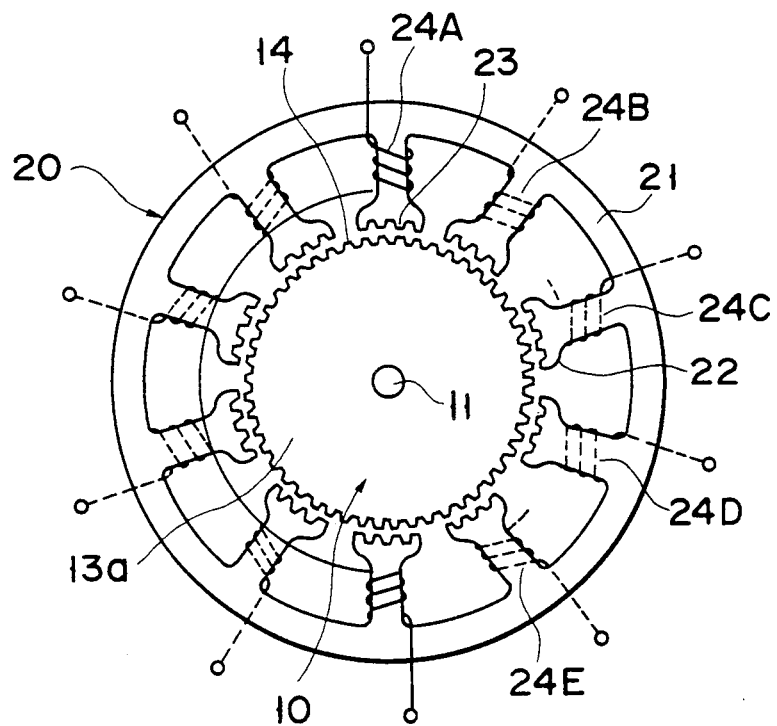
FIG. 3 is a plan view showing a stator incorporating the rotor in FIG. 2.

As shown in FIG. 3, the stator 20 comprises a stator core 21 arranged to enclose the rotor 10, 10 stator poles 22 extending inward from the inner surface of the stator core 21, small teeth 23 formed at an equal pitch on the distal end portion of each stator pole 22, and excitation windings $24_A$, $24_B$, $24_C$, $24_D$, and $24_E$ respectively wound around the stator poles 22. Note that each excitation winding is divided into two parts so as to be wound around a corresponding pair of opposing stator poles 22. With this arrangement, the five-phase stepping motor 1 has five excitation phases A, B, C, D, and E.

As shown in FIG. 1, the drive apparatus 2 comprises a switching circuit 30, a distribution circuit 40, a memory unit 50, an arithmetic unit 60, a velocity setting unit 75, an amplitude setting unit 80, a phase setting unit 85, and a DC power source 90.

Figure 4:
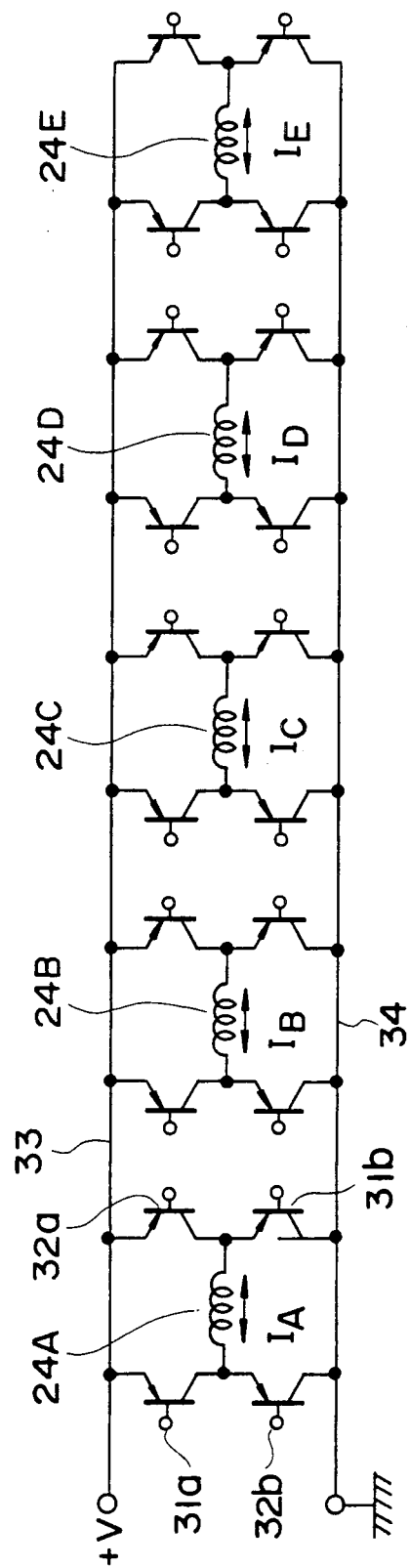
FIG. 4 is a circuit diagram showing an arrangement of a switching circuit incorporated in the drive apparatus in FIG. 1.

The switching circuit 30, as shown in FIG. 4, is designed such that both the ends of each of the excitation windings $24_A$, $24_B$, $24_C$, $24_D$, and $24_E$ are respectively connected to output lines 33 and 34 of the DC power source 90 through power transistors 31a, 31b, 32a, and 32b. Of these power transistors 31a, 31b, 32a, and 32b, pairs each located on a diagonal line are sequentially ON/OFF-controlled by the distribution circuit 40 (to be described below). With this control, positive or negative exciting currents $I_A$, $I_B$, $I_C$, $I_D$, and $I_E$ flow in the respective windings, and generate magnetic fields required for driving the stepping motor between the stator 20 and the rotor 10.

The distribution circuit 40 has the same arrangement as that of a known circuit. More specifically, the distribution circuit 40 ON/OFF-controls the power transistors 31a, 31b, 32a, and 32b in response to timing P supplied from the arithmetic unit 60 (to be described later). As indicated by a typical operation sequence in FIG. 5, the distribution circuit 40 outputs base signals for ON/OFF-controlling the power transistors 31a, 31b, 32a, and 32b so as to sequentially switch and supply the exciting currents $I_A$, $I_B$, $I_C$, $I_D$, and $I_E$ to the excitation windings $24_A$, $24_B$, $24_C$, $24_D$, and $24_E$ of the respective phases in a predetermined order. In this embodiment, a sequence of 10 steps is repeated.

The memory unit 50 stores a program for operating the arithmetic unit 60 (to be described later) and pulse rate data of the timing pulses P required to reduce the intrinsic velocity fluctuation of the stepping motor 1 to be driven. According to the drive apparatus 2, after the stepping motor 1 is manufactured, the operation range from the minimum to the maximum velocity is divided into a plurality of stages, and velocity fluctuation in a 10-step range in each stage is checked, thus allowing the memory unit 50 to store, in advance, the optimal frequency of each timing pulse P for reducing the velocity fluctuation in each stage, i.e., pulse rate data.

The arithmetic unit 60 reads out pulse rate data corresponding to a velocity designated by the velocity setting unit 75 from the memory unit 50, and controls the time intervals (step intervals) of the timing pulses P to be supplied to the distribution circuit 40 in accordance with the readout pulse rate data.

Figure 6:
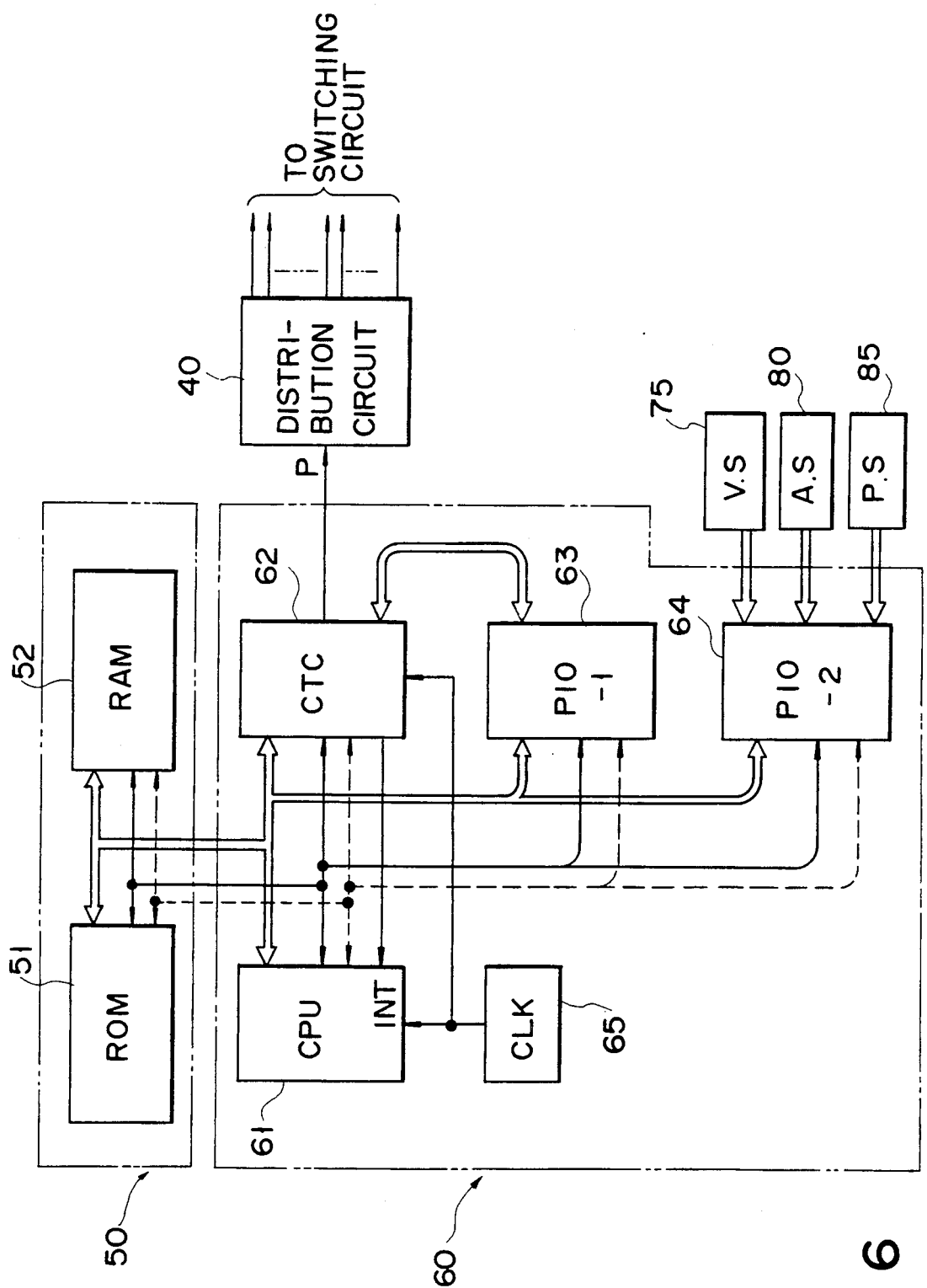
FIG. 6 is a block diagram showing an arithmetic unit incorporated in the drive apparatus in FIG. 1.

FIG. 6 shows a detailed arrangement of the memory unit 50 and the arithmetic unit 60. The memory unit 50 comprises a read-only memory (ROM) 51 for storing the program for operating the arithmetic unit 60, and a random access memory (RAM) 52 for storing pulse rate data and a parameter for the program.

The arithmetic unit 60 comprises a central processing unit (CPU) 61, a counter timer (CTC) 62, two peripheral interfaces (PIOs) 63 and 64, and a fundamental clock generator (CLK) 65. Referring to FIG. 6, thick arrows represent data lines; solid arrows, address lines; and dotted arrows, control lines.

The PIO 63 is used to control the CTC 62. The PIO 64 is used to fetch outputs from the velocity setting unit 75, the amplitude setting unit 80, and the phase setting unit 85. Note that the velocity setting unit 75, the amplitude setting unit 80, and the phase setting unit 85 are respectively constituted by 8-bit switches 76, 77, and 78, as shown in FIG. 7.

The CPU 61 is operated in accordance with the program stored in the ROM 51. When a velocity is designated by the velocity setting unit 75, the CPU 61 reads out pulse rate data corresponding to the designated velocity from the RAM 52. The readout pulse rate data consists of 10 time data for determining the time intervals of the timing pulses P. The CPU 61 reads out the first time data and sets it in the CTC 62. The CTC 62 starts to count fundamental clock pulses generated by the CLK 65 from the instant at which the first time data is set. When the clock pulses are counted up to the number determined by the first time data, the CTC 62 supplies one timing pulse P to the distribution circuit 40. At the same time, the CTC 62 supplies an interrupt signal (INT) to the CPU 61. The CPU 61 reads out the second time data from the RAM 52 at the timing of accessing the interrupt signal, and sets it in the CTC 62. Subsequently, similar operations are sequentially performed. As a result, the arithmetic unit 60 outputs a timing pulse train having one period constituted by the timing pulses P corresponding to the 10 time data, and having a pulse rate fluctuating in a predetermined manner within this one period. This timing pulse train is supplied to the distribution circuit 40.

When drive control of the stepping motor 1 is to be performed by using the drive apparatus 2, pulse rate data must be stored in the RAM 52 prior to an actual driving operation. Pulse rate data is stored in the RAM 52 in the following manner.

Assume that the pulse rate of timing pulses is caused to fluctuate in the form of a pseudo sine wave. In this case, a pulse rate Pr is represented by the following fundamental equation (1):

$$Pr = Pc + \sum_{i=1}^{n} ai \cdot Pc \sin\{2\pi(fi \cdot t - \phi i)\} \quad (1)$$

where Pr: pulse rate (pps)
Pc: center pulse rate (pps)
$ai$: fluctuation amplitude
$\phi i$: fluctuation phase ($0 \leq \phi i \leq 180$)
fi: target frequency
n: number of target frequencies In this embodiment, equation (1) is used. A case will be exemplified, in which n=1 and fi=Pc/10. When a drive velocity is determined by the velocity setting unit 75, the CPU 61 determines the center pulse rate Pc on the basis of the set data. The CPU 61 then determines a target frequency f1 on the basis of the center pulse rate Pc. The CPU 61 determines a fluctuation amplitude $a1$ and the fluctuation phase $\phi 1$ on the basis of data input through the amplitude and phase setting units 80 and 85. Subsequently, the CPU 61 calculates a pulse rate of one period of the target frequency f1 according to equation (1), and temporarily stores the reciprocal of the pulse rate, i.e., one-period time data in the RAM 52 as pulse rate data.

The pulse rate data temporarily stored in the RAM 52 is corrected to obtain final pulse rate data as follows. The drive apparatus 2 is operated to rotate the stepping motor 1 for a trial run while a rotation detector is attached to the rotating shaft 11 of the stepping motor 1. This operation is controlled on the basis of the pulse rate data temporarily stored in the RAM 52. The data from amplitude and phase setting units 80 and 85 are sequentially changed to minimize velocity fluctuation. The CPU 61 causes the RAM 52 to store pulse rate data allowing the minimum velocity fluctuation as final data. This final data is used for an actual driving operation. That is, in this embodiment, the RAM 52 stores periodical velocity fluctuation data of the stepping motor 1.

Figure 5:
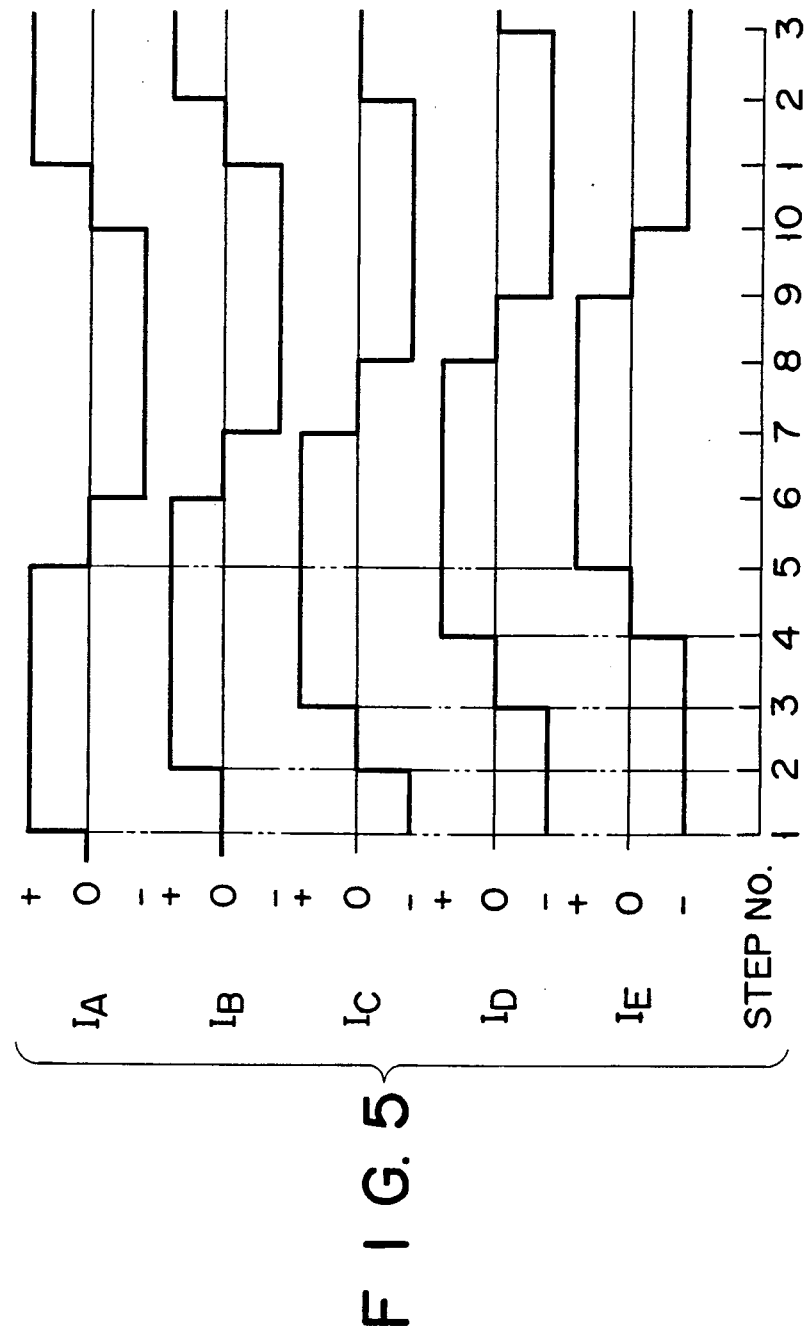
FIG. 5 is a timing chart showing an operation sequence of a distribution circuit incorporated in the drive apparatus in FIG. 1.

With this arrangement, when a given velocity is designated ky the velocity setting unit 75, pulse rate data corresponding to the designated velocity is read out from the RAM 52, and the arithmetic unit 60 outputs the timing pulses P whose time intervals fluctuate in accordance with the pulse rate data. The pulse rate of the timing pulses P is changed at a period, an amplitude, and a phase at which the velocity fluctuation of the stepping motor 1 at the designated velocity can be canceled. That is, the fluctuation phase of the pulse rate is opposite to the phase of the velocity fluctuation. This timing pulse P is supplied to the distribution circuit 40. The distribution circuit 40 outputs base signals for ON/-OFF-controlling the power transistors 31a, 31b, 32a, and 32b of the switching circuit 30 in a predetermined order, as shown in FIG. 5. With this operation, the rotor 10 of the stepping motor 1 starts to rotate smoothly at the designated velocity.

Figure 8A:
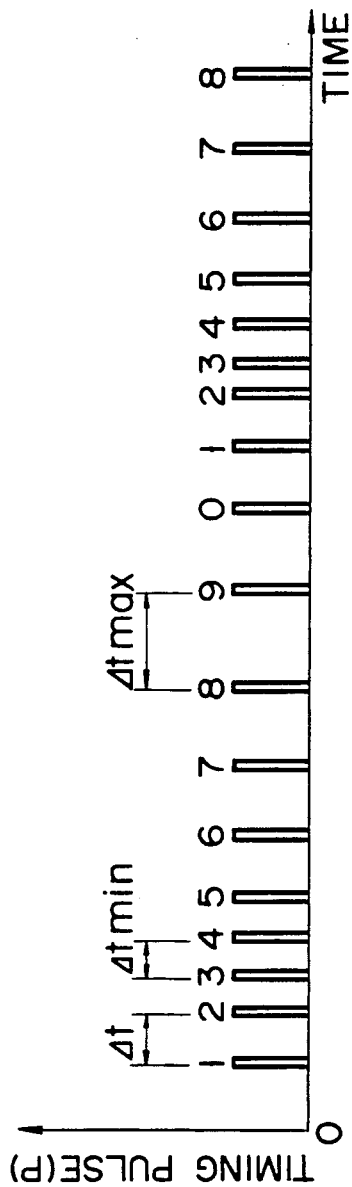
FIG. 8 is a graph showing a pulse train output from the arithmetic unit incorporated in the drive apparatus in FIG. 1.
FIG. 8B is a graph showing a pulse rate converted from the pulse train in FIG. 8A.
Figure 8B:
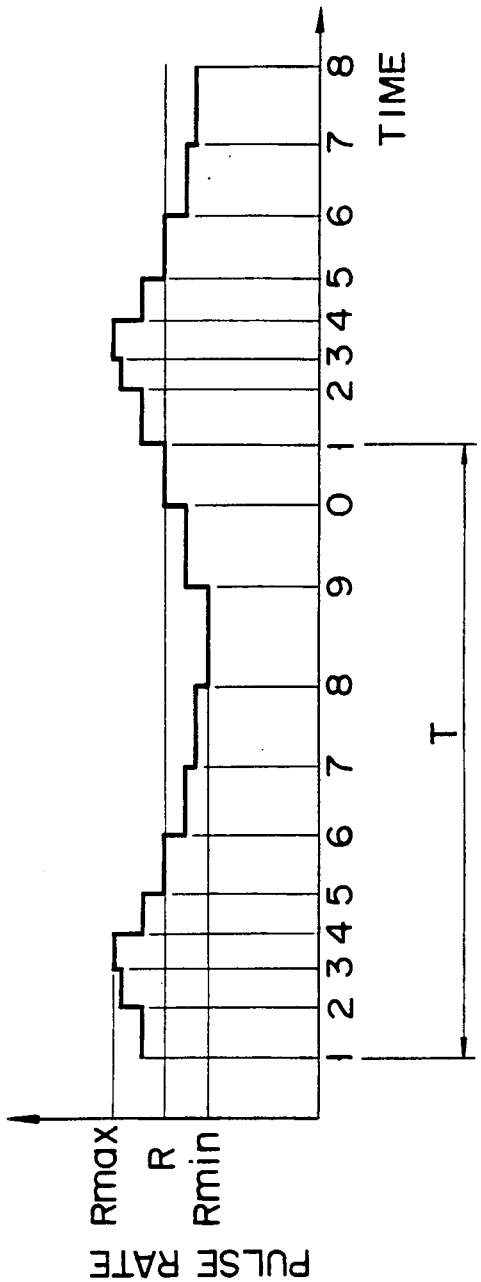

FIG. 8A shows the time intervals of the timing pulses P output from the arithmetic unit 60 when the stepping motor 1 is rotated at a constant velocity by using the drive apparatus 2 shown in FIG. 1. The excitation windings $24_A$ to $24_E$ are switched/excited in synchronism with the timing pulses P, as shown in FIG. 5. In this case, the time intervals of the excitation switching timings fluctuate between $\Delta tmi$ and $\Delta tmax$ with $\Delta t$ set as a reference. The reciprocal of the time interval is a pulse rate. This pulse rate fluctuates at a period T in the form of a sine wave, as shown in FIG. 8B.

Assume that the stepping motor 1 has no intrinsic velocity fluctuation. In this case, if the timing pulses P are output from the arithmetic unit 60 at the time intervals shown in FIG. 8A, the stepping motor 1 is rotated while exhibiting velocity fluctuation at the period T shown in FIG. 8B. However, normal stepping motors always have intrinsic velocity fluctuation. Therefore, the intrinsic velocity fluctuation of any stepping motor can be canceled to smoothly rotate the rotor 10 by matching the pulse rate of the timing pulses P output from the arithmetic unit 60 with the intrinsic velocity fluctuation period of the stepping motor and changing it to have substantially the opposite phase and a predetermined amplitude.

FIG. 9 shows a case wherein the velocity fluctuation of a hybrid five-phase stepping motor is reduced by using the drive apparatus 2 shown in FIG. 1. This reduction is achieved by setting the center pulse rate Pc and the target frequency fi to be 1,500 pps and 150 Hz, respectively. FIG. 10 shows a power spectrum in this case. Referring to FIGS. 9 and 10, dotted curves represent data obtained by driving the same stepping motor using a conventional drive apparatus. As is apparent from FIGS. 9 and 10, the velocity fluctuation can be satisfactorily reduced by using the drive apparatus 2 shown in FIG. 1.

Figure 11:
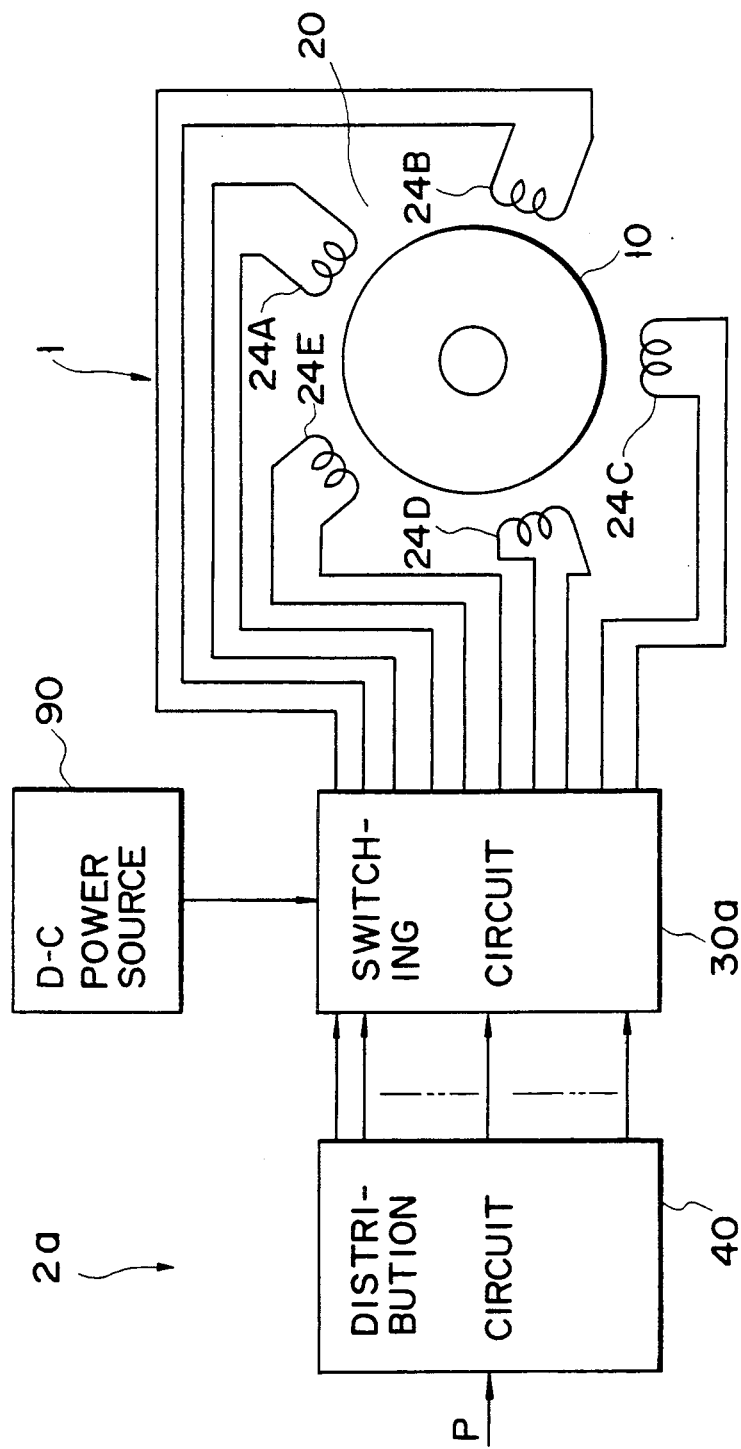
FIG. 11 is a block diagram showing a part of a drive apparatus for a stepping motor according to another embodiment of the present invention.

FIG. 11 shows only a main part of a stepping motor drive apparatus 2a according to another embodiment of the present invention. The same reference numerals in FIG. 11 denote the same parts a in FIG. 1.

A switching circuit 30a of the drive apparatus 2a is different in arrangement from the switching circuit 30 of the drive apparatus 2 shown in FIG. 1.

Figure 12:
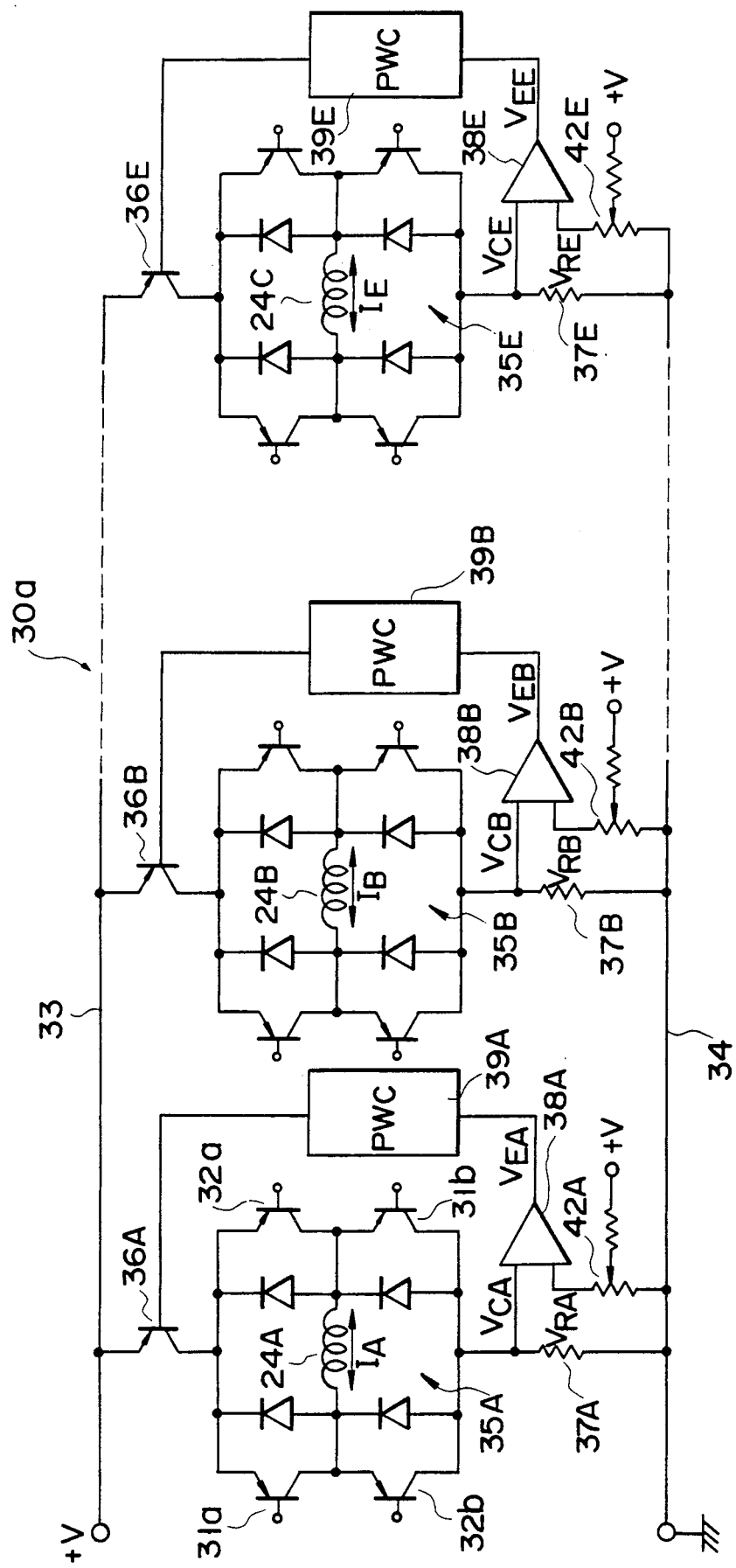
FIG. 12 is a circuit diagram showing an arrangement of a switching circuit incorporated in the drive apparatus in FIG. 11.

As shown in FIG. 12, the switching circuit 30a comprises bridge circuits $35_A$ to $35_E$, constituted by power transistors 31a, 31b, 32a, and 32b, for independently supplying positive or negative currents to excitation windings $24_A$ to $24_E$. One input terminal of each of the bridge circuits $35_A$ to $35_E$ is connected to one output line 33 of a DC power source 90 through a corresponding one of power transistors $36_A$ to $36_E$. The other input terminal of each of the bridge circuits $35_A$ to $35_E$ is connected to the other output line 34 of the DC power source 90 through a corresponding one of shunt resistors $37_A$ to $37_E$.

Currents $I_A$ to $I_E$ flowing in the excitation windings $24_A$ to $24_E$ are respectively converted into voltages $V_{CA}$ to $V_{CE}$ by the corresponding shunt resistors $37_A$ to $37_E$. Each of the voltages $V_{CA}$ to $V_{CE}$ is applied to one input terminal of a corresponding one of comparators $38_A$ to $38_E$. Each of reference voltages $V_{RA}$ to $V_{RE}$ is applied to the other input terminal of a corresponding one of the comparators $38_A$ to $38_E$. Differential voltages $V_{EA}$ to $V_{EE}$ are respectively output from the comparators $38_A$ to $38_E$. These differential voltages $V_{EA}$ to $V_{EE}$ are respectively applied to pulse width controllers $39_A$ to $39_E$. The pulse width controllers $39_A$ to $39_E$ respectively output signals corresponding to the input differential voltages. The power transistors $36_A$ to $36_E$ are respectively ON/OFF-controlled by the output signals from the pulse width controllers $39_A$ to $39_E$. With this control, the currents $I_A$ to $I_E$ flowing in the respective excitation windings $24_A$ to $24_E$ are kept constant.

The method of supplying constant currents to the respective excitation windings $24_A$ to $24_E$ in this manner is called a constant-current chopping drive method. In this embodiment, the values of the reference voltage $V_{RA}$ to $V_{RE}$ are finely adjusted first by variable resistors $42_A$ to $42_E$ for the respective excitation windings in order to correct output torque variations caused by variations in resistance of the respective excitation windings.

Figure 13:
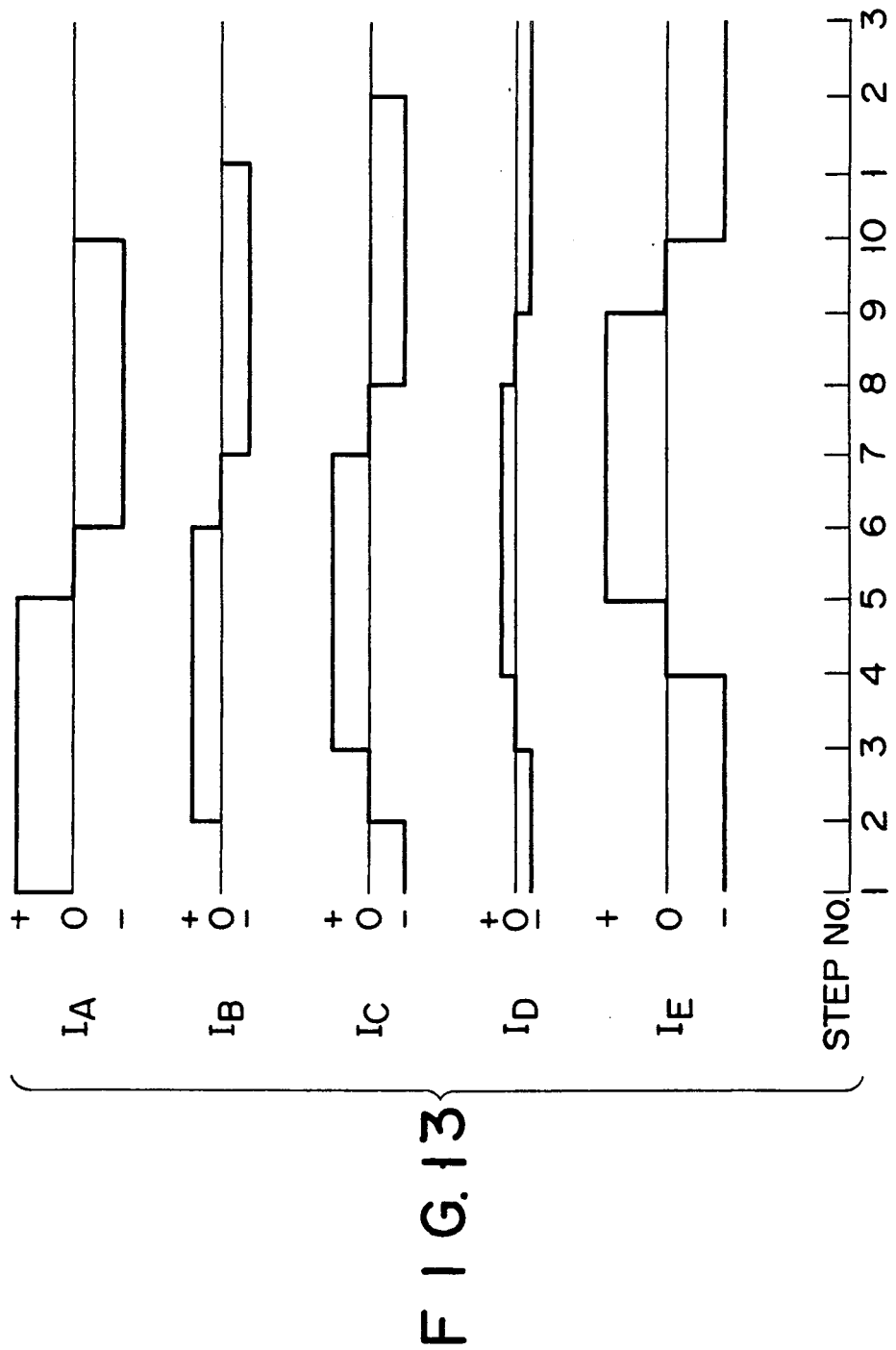
FIG. 13 is a timing chart showing the levels of currents flowing in the respective excitation windings of a stepping motor to be driven by the drive apparatus in FIG. 11.

FIG. 13 shows levels of the excitation windings $I_A$ to $I_E$ obtained when output torque variations are corrected by finely adjusting the reference voltages $V_{RA}$ to $V_{RE}$.

After such correction is performed, optimal pulse rate data capable of minimizing the velocity fluctuation of a stepping motor 1 is obtained by using an arithmetic unit 60, a velocity setting unit 75, an amplitude setting unit 80, and a phase setting unit 85. The obtained pulse rate data is stored in a memory unit 50. In an actual driving operation, the pulse rate data is read out from the memory unit 50, and the stepping motor 1 is driven on the basis of the readout pulse rate data.

With this operation, the velocity fluctuation of the stepping motor 1 can be minimized in the same manner as in the embodiment shown in FIG. 1.

Figure 14:
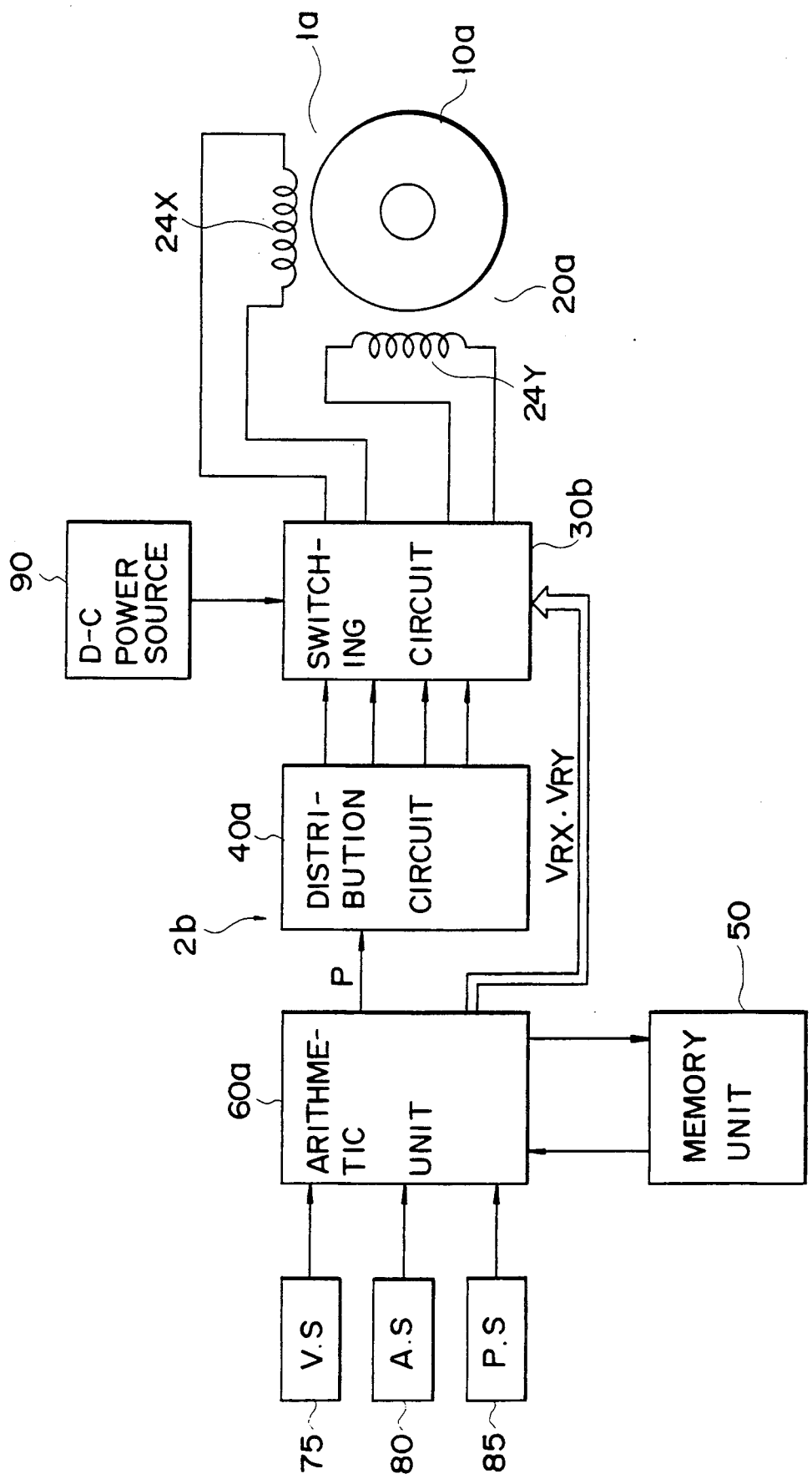
FIG. 14 is a block diagram showing a drive apparatus for a stepping motor according to still another embodiment of the present invention.

FIG. 14 shows a drive apparatus 2b for driving a two-phase stepping motor 1a by applying the present invention. The same reference numerals in FIG. 14 denote the same parts in FIG. 1.

In the above-described embodiments, the stepping motors are exemplified which allow relatively smooth changes in time interval of excitation switching timings. In a two-phase stepping motor, however, output torque fluctuation due to variations in excitation phase may occur at a 4-step period. In such a case, the time intervals of excitation switching timings cannot be smoothly changed by changing them in the form of a sine wave.

In such a case, a microstep drive is preferably used together with the above-described system. In the microstep drive, currents applied to different excitation windings which are simultaneously excited are increased/decreased stepwise so as to finely change a rotor stop position stepwise.

The drive apparatus 2b shown in FIG. 14 uses the microstep drive together with the above-described system.

The stepping motor 1a includes a rotor 10a and a stator 20a. The rotor 10a and the stator 20a have substantially the same arrangements as those of the rotor and the stator of the five-phase stepping motor. The stepping motor 1, however, has only two excitation windings $24_X$ and $24_Y$.

The drive apparatus 2b comprises a switching circuit 30b, a distribution circuit 40a, a memory unit 50, an arithmetic unit 60a, a velocity setting unit 75, an amplitude setting unit 80, a phase setting unit 85, and a DC power source 90.

As shown in FIG. 15, the switching circuit 30b has substantially the same arrangement as that of the switching circuit shown in FIG. 12. More specifically, in this embodiment, the chopping drive system is also employed which ON/OFF-controls power transistors $36_X$ and $36_Y$ by using comparators $38_X$ and $38_Y$ and pulse width controllers $39_X$ and $39_Y$. In this embodiment, however, reference voltages $V_{RX}$ and $V_{RY}$ are applied to the arithmetic unit 60a (to be described later) through terminals $43_X$ and $43_Y$, respectively.

The distribution circuit 40a outputs base signals for ON/OFF-controlling power transistors 31a, 31b, 32a, and 32b constituting bridge circuits $35_X$ and $35_Y$. These base signals are output to cause currents flowing in the excitation windings $24_X$ and $24_Y$ to have a phase difference of 90° and to change the directions of the currents flowing in the excitation windings $24_X$ and $24_Y$ every time eight timing pulses P are input.

As shown in FIG. 16, the arithmetic unit 60a reads out pulse rate data corresponding to a velocity designated by the velocity setting unit 75 from the memory unit 50, and controls the time intervals (step intervals) of the timing pulses P to be supplied to the distribution circuit 40a on the basis of the readout pulse rate data, in substantially the same manner as in the unit shown in FIG. 6. In this embodiment, however, a PIO 63 outputs digital signals $D_X$ and $D_Y$ which are increased and decreased in level stepwise at a predetermined change rate in synchronism with the timing pulses P, and have a phase difference of 90°. These digital signals are formed by a CPU 61 on the basis of data obtained by a trial run. The digital signal $D_X$ is converted into an analog signal by a D/A converter 66a, and is supplied to a comparator $38_X$ as a reference voltage $V_{RX}$. Similarly, the digital signal $D_Y$ is converted into an analog signal by a D/A converter 66b, and is supplied to a comparator $38_Y$ as a reference signal $V_{RY}$.

FIG. 17A shows currents $I_X$ and $I_Y$ flowing in the excitation windings $24_X$ and $24_Y$ when the stepping motor 1a is driven by the drive apparatus 2b of this embodiment, and the timing pulses P output from the arithmetic unit 60a. FIG. 17B shows changes in pulse rate at this time.

In this embodiment, microstep driving is realized by increasing/decreasing the reference voltages $V_{RX}$ and $V_{RY}$ in synchronism with the timing pulses P. In addition, currents flowing in the excitation windings $24_X$ and $24_Y$ are adjusted by adjusting the change rates of the reference voltages $V_{RX}$ and $V_{RY}$. With this operation, output torque variations due to mismatching of winding resistances can be corrected. Moreover, the pulse rate of the timing pulses p is caused to fluctuate so as to have an 8-step period and a phase opposite to that of the periodic velocity fluctuation of the stepping motor 1a, thus canceling the velocity fluctuation. Therefore, in the two-phase stepping motor, the velocity fluctuation can be satisfactorily reduced.

Figure 18:
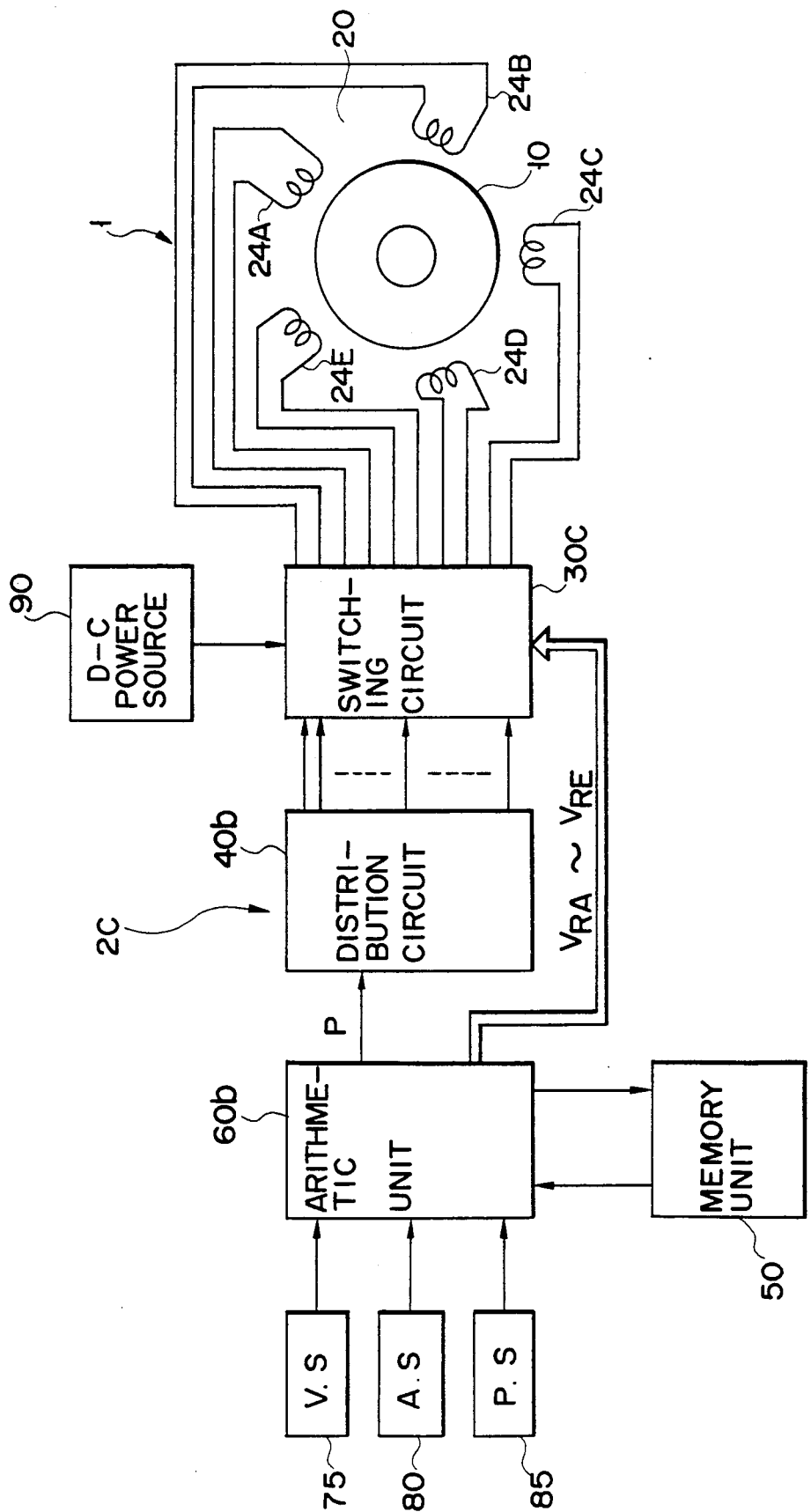
FIG. 18 is a block diagram showing a drive apparatus for a stepping motor according to still another embodiment of the present invention.

FIG. 18 shows a drive apparatus 2c for driving a five-phase stepping motor 1 by applying the present invention. The same reference numerals in FIG. 18 denote the same parts as in FIG. 1.

The drive apparatus 2c drives the five-phase stepping motor 1 by the same drive method as employed by the drive apparatus 2b shown in FIG. 14.

The drive apparatus 2c comprises a switching circuit 30c, a distribution circuit 40b, a memory unit 50, an arithmetic unit 60b, a velocity setting unit 75, an amplitude setting unit 80, a phase setting unit 85, and a DC power source 90.

Figure 19:
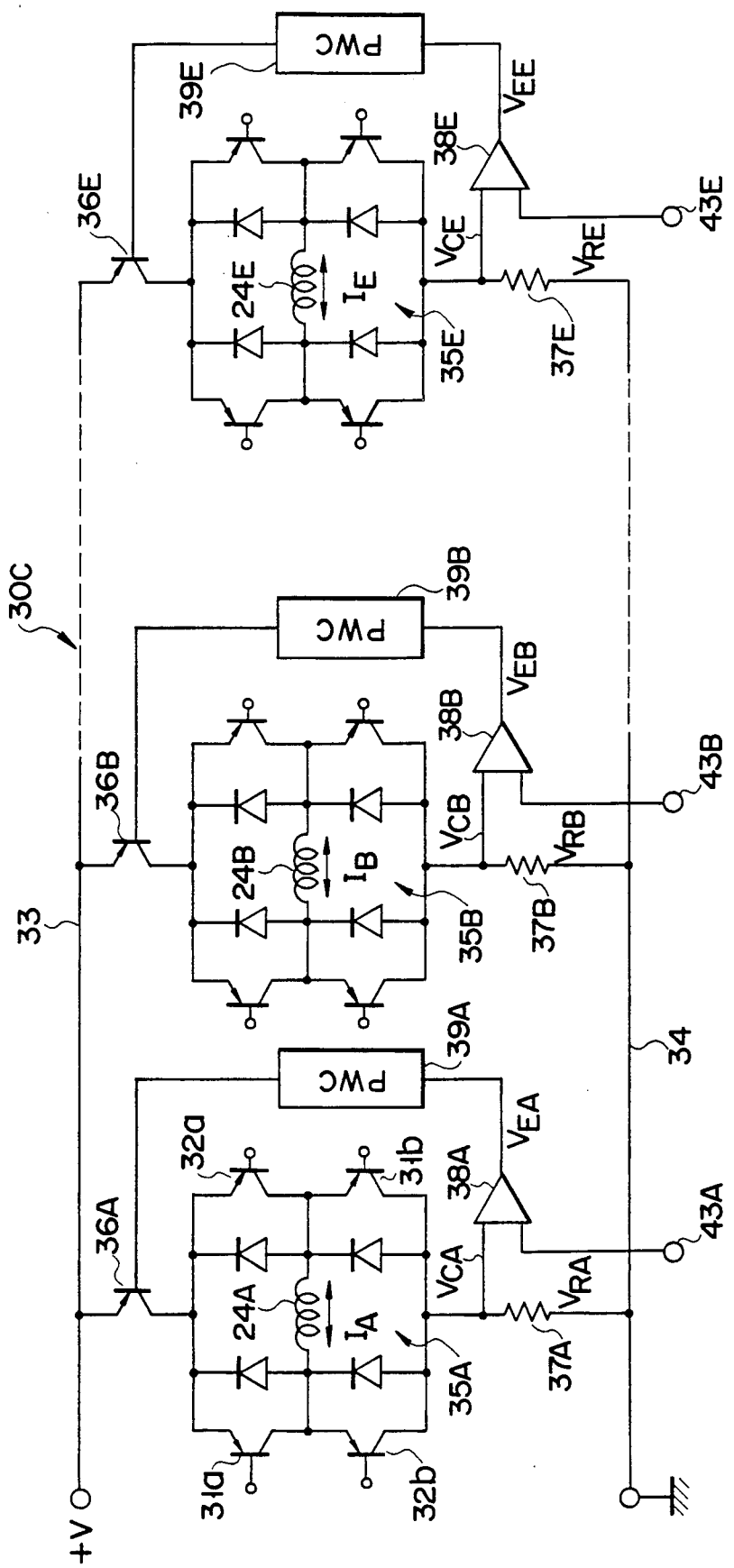
FIG. 19 is a circuit diagram showing an arrangement of a switching circuit incorporated in the drive apparatus in FIG. 18.

As shown in FIG. 19, the switching circuit 30c has substantially the same arrangement as that of the switching circuit shown in FIG. 15. That is, in this embodiment, the chopping drive system is also employed which ON/OFF-controls power transistors $36_A$ to $36_E$ by using comparators $38_A$ to $38_E$ and pulse width controllers $39_A$ to $39_E$. In addition, reference voltages $V_{RA}$ to $V_{RE}$ from the comparators $38_A$ to $38_E$ are applied to the arithmetic unit 60b (to be described later) through terminals $43_A$ to $43_E$, respectively.

The distribution circuit 40b outputs base signals for ON/OFF-controlling power transistors 31a, 31b, 32a, and 32b respectively constituting bridge circuits $35_A$ to $35_E$. These base signals are output to cause currents flowing in excitation windings $24_A$ to $24_E$ to have a phase difference corresponding to four timing pulses P output from the arithmetic unit 60b, as shown in FIG. 21.

As shown in FIG. 20, the arithmetic unit 60b has substantially the same arrangement as that of the arithmetic unit shown in FIG. 16. More specifically, the arithmetic unit 60b reads out pulse rate data corresponding to a velocity designated by the velocity setting unit 75 from the memory unit 50, and controls the time intervals (step intervals) of timing pulses P to be supplied to the distribution circuit 40b on the basis of the readout pulse rate data. In this embodiment, however, another PIO 67 is arranged. The PIOs 63 and 67 output digital signals $D_A$ to $D_E$ which are increased and decreased in level stepwise at predetermined change rates in synchronism with the timing pulses P. These digital signals $D_A$ to $D_E$ are formed by a CPU 61 on the basis of data obtained by a trial run. The digital signals $D_A$ to $D_E$ are respectively converted into analog signals by D/A converters 66a to 66e. These analog signals are supplied to the comparators $38_A$ to $38_E$ as reference voltages $V_{RA}$ to $V_{RE}$, respectively.

Figures 21A, 21B:
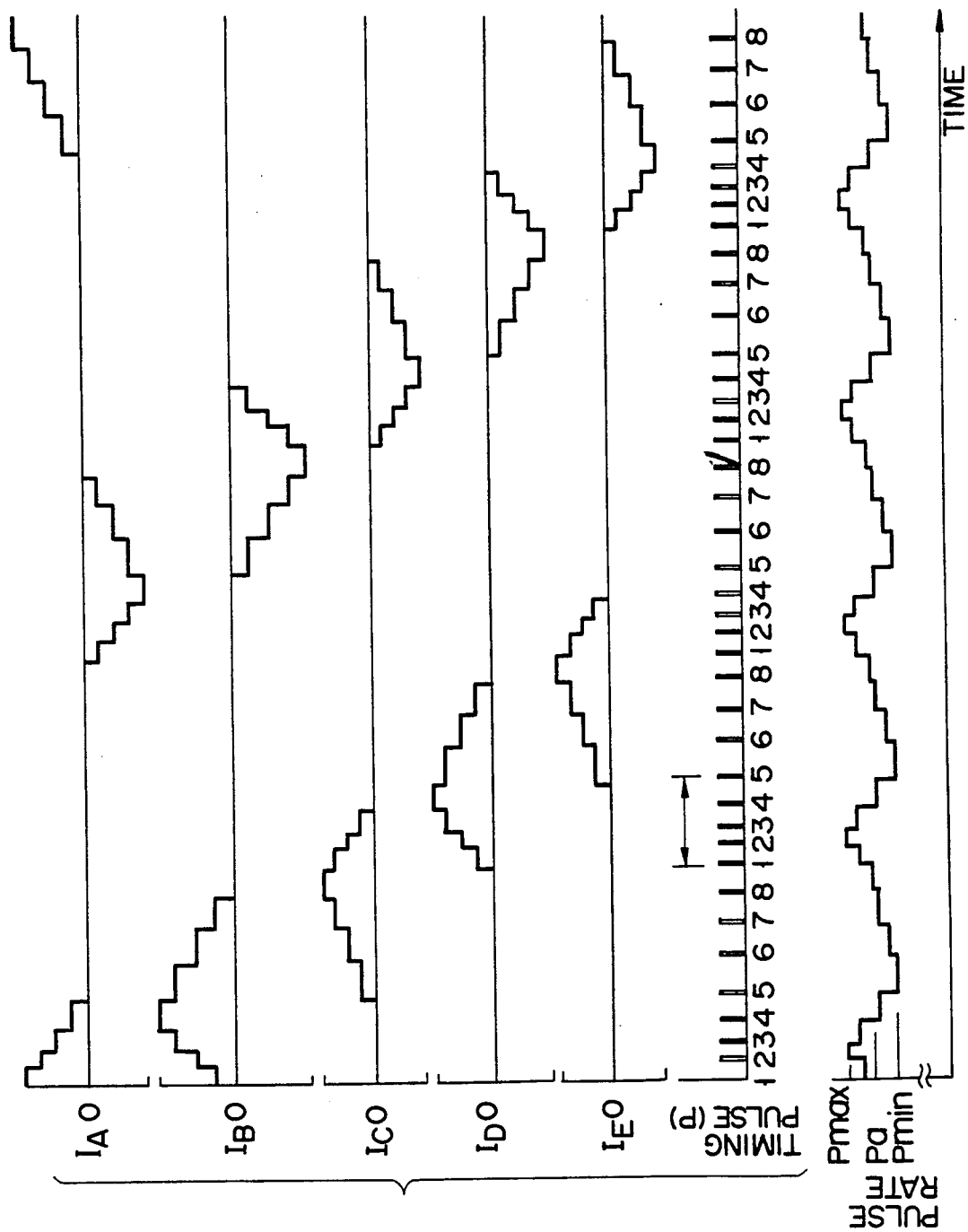
FIG 21A is a timing chart showing the waveforms of currents flowing in the respective excitation windings of a stepping motor to be driven by the drive apparatus in FIG. 18.
FIG. 21B is a graph showing changes in a pulse rate under the condition shown in FIG. 21A.

FIG. 21A shows currents $I_A$ to $I_E$ flowing in the respective excitation windings $24_A$ to $24_E$ when the stepping motor 1 is driven by the drive apparatus 2c of this embodiment, and the timing pulses P output from the arithmetic unit 60b. FIG. 21B shows changes in pulse rate at this time.

In this embodiment, microstep driving is also realized by using the reference voltages $V_{RA}$ to $V_{RE}$ which are increased/decreased in level in synchronism with the timing pulses P. In addition, currents flowing in the respective excitation windings $24_A$ to $24_E$ are adjusted by adjusting the change rates of the reference voltages $V_{RA}$ to $V_{RE}$, thus correcting output torque fluctuation due to mismatching of winding resistances. Moreover, the pulse rate of the timing pulses P is caused to fluctuate so as to have an 8-pulse period and a phase opposite to that of the velocity fluctuation of the stepping motor 1, thereby canceling the velocity fluctuation.

Figure 22:
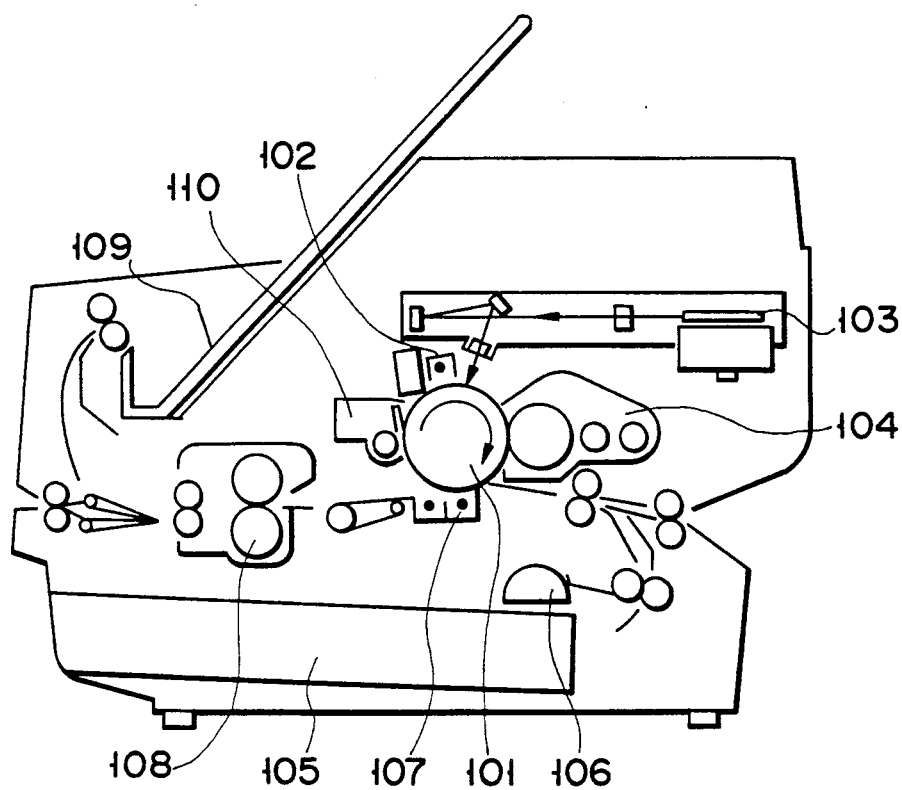
FIG. 22 is a view showing an arrangement of a laser page printer incorporating a drive apparatus of the present invention.

FIG. 22 shows a laser page printer as a mechatronic equipment incorporating a drive apparatus for a stepping motor according to the present invention.

A printing process of the laser page printer will be briefly described below with reference to FIG. 22.

Referring to FIG. 22, reference numeral 101 denotes a photosensitive drum. A photoconductive layer such as an organic photoconductive layer is formed on the surface of the photosensitive drum 101. Upon radiation of light, the specific resistance of the irradiated portion of the photoconductive layer is changed. The photosensitive drum 101 is rotated at a constant velocity. In this state, the surface of the photosensitive drum 101 is uniformly charged by a charger 102. A laser beam deflected by a polygon mirror 103 is then radiated on the charged surface of the photosensitive drum 101 while it is ON/OFF-controlled in accordance with image data. The specific resistance of each portion of the surface of the photosensitive drum 101 which is irradiated with the laser beam is decreased, and the charge of the portion is discharged through a ground line connected to the photosensitive drum 101. As a result, an electrostatic latent image is formed on the surface of the photosensitive drum 101.

A developing unit 104 supplies a toner having the same polarity as that of the charge to the surface of photosensitive drum 101 on which the electrostatic latent image is formed. As a result, the toner adheres to the electrostatic latent image so as to form a toner image. Meanwhile, a sheet of paper is picked up from a paper cassette 105. The sheet is then conveyed by a roller 106 to a position under the photosensitive drum 101. At the same time, a transfer charger 107 is driven to transfer the toner image onto the sheet. The sheet is further conveyed to a fixing unit 108 constituted by heat rollers. As a result, the toner adhering to the sheet is melted and pressed to fix the image. Upon fixing, the sheet is discharged to a paper stacker 109. In addition, after the transfer operation is completed, the surface of the photosensitive drum 101 is cleaned by a cleaner 110. With this cleaning, the residual toner is removed, and the printer is set to be ready for the next image forming process.

In the laser page printer subjected to such a printing process, if the rotation velocity of the photo-sensitive drum 101 fluctuates, a formed image is disturbed. In order to improve the image quality, therefore, the rotation velocity fluctuation of the photosensitive drum 101 must be minimized.

For this purpose, in this embodiment, the photo-sensitive drum 101 is driven in the following manner. As shown in FIG. 23, a rotation output from a stepping motor 111 is transmitted to a shaft 115 of the photo-sensitive drum 101 through a small-diameter pulley 112, a timing belt 113, and a large-diameter pulley 114.

The stepping motor 111 is driven by a drive apparatus 2d. The drive apparatus 2d has the same arrangement as that of the drive apparatus shown in FIG. 1. More specifically, the drive apparatus 2d matches the pulse rate of timing pulses determining the excitation switching timings of the stepping motor 111 with the intrinsic velocity fluctuation period of a system including the stepping motor 111 and the photosensitive drum 101 to be driven thereby, while causing it to fluctuate so as to have substantially the opposite phase to that of the intrinsic velocity fluctuation. In addition, the fluctuation amplitude of the pulse rate is optimally set. Therefore, a memory unit 50 incorporated in the drive apparatus 2d (see FIG. 1) stores, in advance, pulse rate data which can cancel the intrinsic velocity fluctuation of the system including the stepping motor 111 and the photosensitive drum 101 to be driven thereby. Furthermore, in this embodiment, in order to respond to changes in intrinsic velocity fluctuation due to replacement of the photosensitive drum 101, a card 116 is used to record the velocity fluctuation data of the photosensitive drum 101 obtained by measuring the velocity fluctuation with a constant pulse rate of timing pulses at a place where the printer is operated, and the data of the memory unit 50 is updated by using this card 116. Referring to FIG. 23, reference numeral 117 denotes a semiconductor laser element for converting image data into an ON/OFF signal of light; and 118, a reflecting mirror. Reference symbol S denotes a drive start/stop signal to be supplied to the drive apparatus 2d.

With this arrangement, the intrinsic rotation fluctuation of the photosensitive drum vibrating system can be canceled by rotation fluctuation caused by changes in pulse rate of timing pulses, and hence the photosensitive drum 101 can be rotated at almost constant velocity. Therefore, an excellent image can be obtained. Especially, when a pictorial image including a halftone portion is to be formed, irregularity is caused in a halftone image portion by slight rotation fluctuation of the photosensitive drum 101. Such a problem, however, can be reliably solved by the present invention.

In the above described embodiment, the drive apparatus of the present invention is incorporated in the laser page printer. However, the same effect can be obtained when the drive apparatus is incorporated in a printer having, e.g., an LED array head, as a light source, in which a large number of LEDs are arranged. In addition, the drive apparatus of the present invention can be incorporated in a printer of an electrostatic recording system using an ion current or of a magnetic head recording system.

Figure 24:
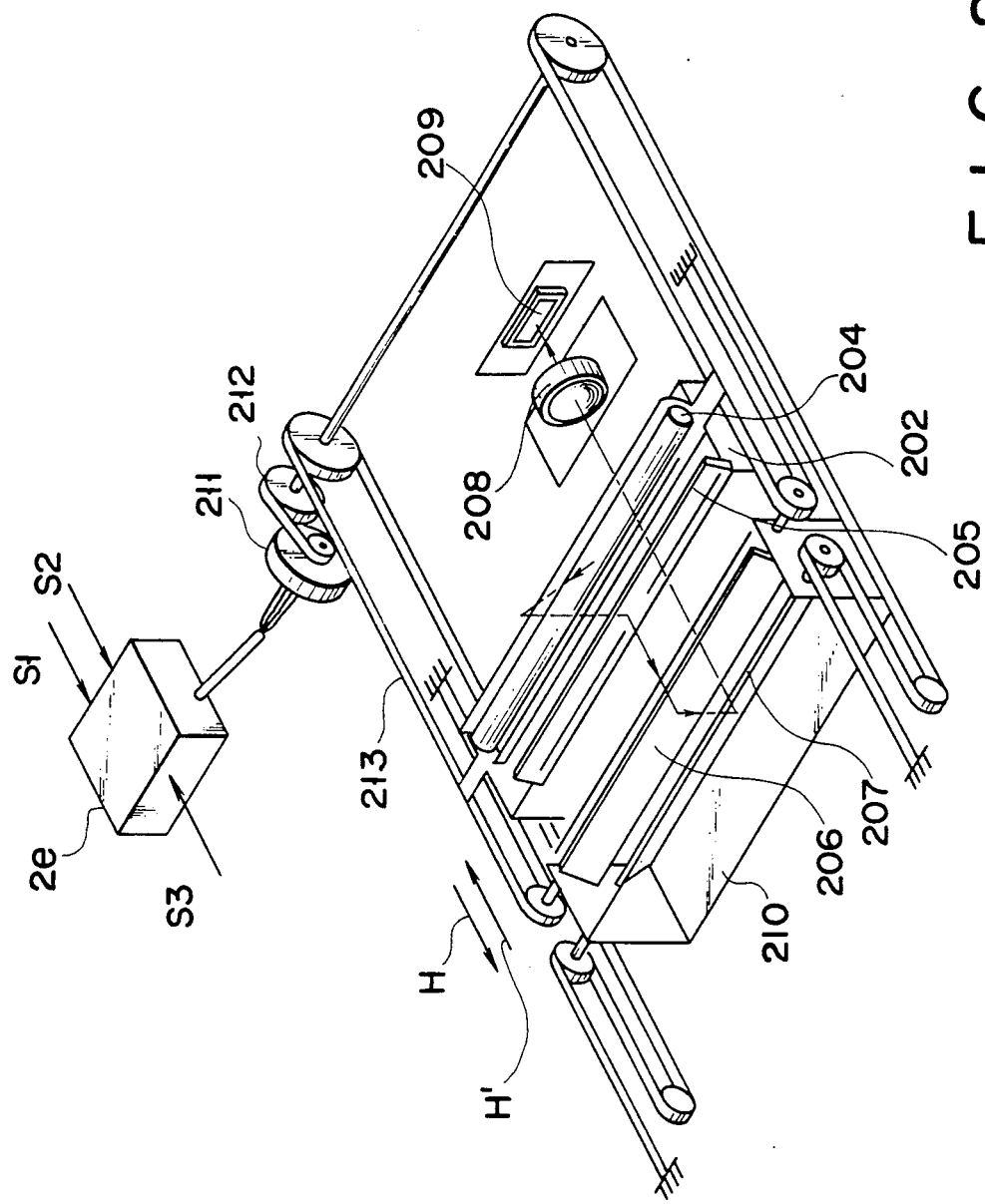
FIG. 24 is a view showing a main part of an image scanner incorporating a drive apparatus of the present invention.

FIG. 24 shows a main part of an image scanner incorporating a drive apparatus for a stepping motor according to the present invention. FIGS. 25 and 26 show the optical system of the scanner.

The principle of image read by means of the image scanner will be described below with reference to FIGS. 24 to 26.

As shown in FIG. 25, an image document 201 from which an image is to be read is placed on a document table 203 made of transparent glass arranged on a scanner unit 202. The scanner unit 202 includes a light source lamp 204. Light is radiated from the light source lamp 204 onto the image document 201 on the document table 203. The irradiated document image is formed on an image read element, a CCD line sensor 209 in this case, through mirrors 205, 206, and 207, and a lens 208 in the order named.

The scanner unit 202 and a mirror unit 210 consisting of the mirrors 206 and 207 are moved/controlled by a stepping motor 211 and timing belts 212 and 213 in directions indicated by arrows H and H', as shown in FIG. 24. The direction indicated by the arrow H represents the direction in which an image document is read, whereas the direction indicated by the arrow H' represents the return direction. The scanner unit 202 and the mirror unit 210 are controlled by the timing belts and timing pulleys so as to be moved at a velocity ratio of 2:1. With this control, while the document surface is scanned, a distance f1 between the lens 208 and the document surface is always kept constant, and hence the size of an image formed on the CCD line sensor 209 is kept constant, as shown in FIG. 26.

In the image scanner having the above-described arrangement, while the scanner unit 202 and the mirror unit 210 are moved at a constant velocity in the direction indicated by the arrow H, image data is read from the CCD line sensor 209 at a predetermined read frequency.

The read resolution of this image scanner in the moving direction is determined by the amount of movement cf the scanner unit 202 within the read period of the CCD line sensor 209. The resolution in a direction perpendicular to the moving direction is determined by the number of bits of the CCD line sensor 209. In this case, since the read period of the CCD line sensor 209 is always kept constant, if the velocity of the scanner unit 202 is not constant, a portion which is deviated from a document portion to be read is read. As a result, when image data read by the CCD line sensor 209 is displayed on a printer or display, the deviated portion is reproduced as image irregularity.

In this embodiment, therefore, a drive apparatus 2e is used to drive the stepping motor 211 for driving the scanner unit 202 and the mirror unit 210. The drive apparatus 2e has substantially the same arrangement as that of the drive apparatus shown in FIG. 1. More specifically, the drive apparatus 2e is designed to cause the pulse rate of timing pulses for determining the excitation switching timings of the stepping motor 211 to fluctuate so as to coincide with the intrinsic velocity fluctuation period of a system including the stepping motor 211 and elements to be driven thereby and to have a phase opposite to that of the intrinsic velocity fluctuation. In addition, the fluctuation amplitude of the pulse rate is optimally set. Referring to FIG. 24, reference symbol $S_1$ denotes a forward rotation control command; $S_2$, a reverse rotation control command; and $S_3$, a velocity switching control command for selecting an enlargement or reduction mode. Therefore, a memory unit 50 (see FIG. 1) of the drive apparatus 2e stores, in advance, pulse rate data for canceling the velocity fluctuation of the stepping motor 211 at each velocity.

With this arrangement, the intrinsic velocity fluctuation of the scanner unit vibrating system can be canceled by velocity fluctuation caused by the fluctuation of the pulse rate of timing pulses. As a result, the velocity fluctuation of the stepping motor 211 can be satisfactorily reduced. Therefore, the repeatability of read image data can be improved. In addition, in this embodiment, for example, an image can be read at an enlarged or reduced scale by changing the moving velocity of the scanner unit 202 while the read frequency of the CCD line sensor 209 is kept constant. The present invention is effective especially when an image is to be read at an enlarged scale. More specifically, when an image is to be read at an enlarged scale, the moving velocity of the scanner unit 202 is lower than a velocity in a one-to-one copy mode. During a low-velocity operation, the velocity fluctuation of the stepping motor 211 tends to be increased. In addition, since the read pitch of the scanner unit 202 in the moving direction is decreased a read image is easily influenced by the velocity fluctuation. In this embodiment, however, since the velocity fluctuation of the scanner unit 202 can be suppressed at any copy magnification, the above-described problem can be solved.

Figure 27:
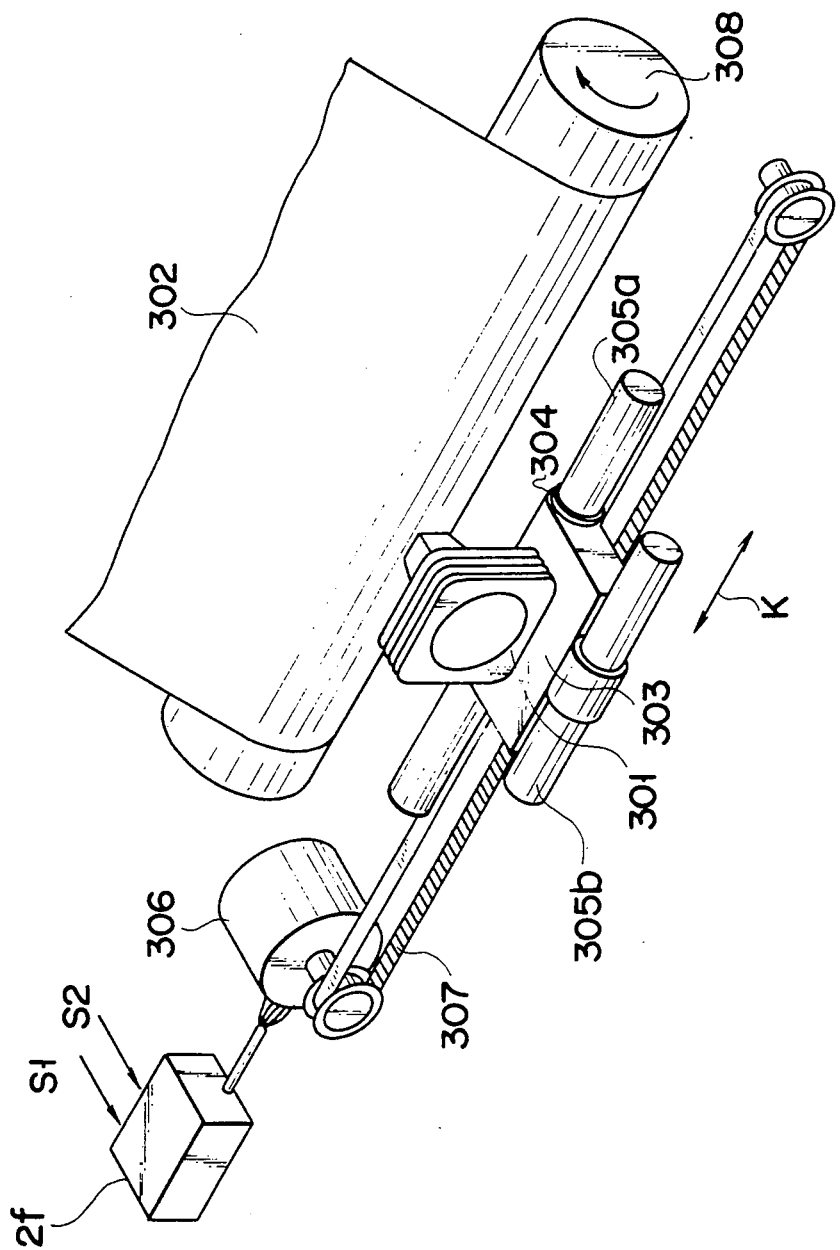
FIG. 27 is a perspective view showing a main part of a wire dot serial printer incorporating a drive apparatus of the present invention.

FIG. 27 shows a main part of a wire dot serial printer incorporating a drive apparatus for a stepping motor according to the present invention.

The principle of image formation of this printer will be described below. Each printing wire (not shown) arranged in a printing head 301 is controlled by a magnetic force to protrude from the distal end of the printing head 301 for a predetermined period of time. An ink ribbon (not shown) in which fibers are impregnated with an ink is interposed between the printing head 301 and a sheet 302. Each printing wire urges the ink ribbon against the sheet 302 so as to print a dot on the sheet 302. In this embodiment, 24 printing wires are arranged in the printing head 301. The respective wires are selectively controlled to protrude. An image such as a character is formed by a combination of dots printed by such protrusion.

The printing head 301 is fixed to a carriage 303. The carriage 303 is supported by guide shafts 305a and 305b through an oil-impregnated bearing 304. The carriage 303 is controlled by a stepping motor 306 and a timing belt 307 so as to reciprocate in directions indicated by an arrow K in FIG. 27. With this operation, the printing wires of the printing head 301 are driven to print an image corresponding to one reciprocating motion. Upon completion of printing by one reciprocating motion, a platen roller 308 which is holding the sheet 302 is rotated by a predetermined amount, and an image printing operation of the next reciprocating motion is started.

As shown in FIG. 28, the platen 308 is driven by a stepping motor 309. That is, a rotation output from the stepping motor 309 is transmitted to the platen roller 308 through gears 310, 311, and 312. Note that the sheet 302 is tightly held on the platen roller 308 by means of a pressure roller 313.

In this embodiment, the drive frequency of the printing head 301 is kept constant. For this reason, if the moving velocity of the carriage 303 on which the printing head 301 is mounted fluctuates, a printing position is deviated from a proper position to disturb an image. Therefore, the carriage 303 is required to be always moved at a constant velocity.

For this purpose, in this embodiment, a drive apparatus 2f is used to drive the stepping motor 306 for driving the carriage 303. The drive apparatus 2f has substantially the same arrangement as that of the drive apparatus shown in FIG. 1. More specifically, the drive apparatus 2f is designed to cause the pulse rate of timing pulses for determining the excitation switching timings of the stepping motor 306 to fluctuate so as to coincide with the intrinsic velocity fluctuation period of a system including the stepping motor 306 and elements to be driven thereby and to have a phase substantially opposite to that of the intrinsic velocity fluctuation. In addition, the fluctuation amplitude of the pulse rate is optimally set. Referring to FIG. 27, $S_1$ denotes a forward rotation control command; and $S_2$, a reverse rotation control command. In this embodiment, since one printing operation is performed by one reciprocating motion of the carriage 303, a memory unit 50 (see FIG. 1) of the drive apparatus 2f stores, in advance, pulse rate data in forward movement and pulse rate data in backward movement.

With this arrangement, since the intrinsic velocity fluctuation of the carriage vibrating system and velocity fluctuation caused by the pulse rate fluctuation can be controlled to have opposite phases, the velocity fluctuation of the stepping motor 306 can be satisfactorily reduced, and the carriage 303 can be moved almost at a constant velocity. Therefore, the image quality of a printed image can be improved.

In the above embodiment, the stepping motor for driving the carriage of the wire dot serial printer is controlled by the drive apparatus of the present invention. However, the same effect can be obtained when the present invention is applied to other serial printers, e.g., printers having an ink jet head and a heat-sensitive head as printing heads.

FIG. 29 shows a main part of a sublimation type thermal line printer incorporating a drive apparatus for a stepping motor according to the present invention.

The principle of this printer will be described first. Referring to FIG. 29, reference numeral 401 denotes a thermal head; 402, a platen roller arranged to oppose the thermal head 401; and 403, a sheet of paper which is guided by the platen roller 402 and is moved along the front surface of the thermal head 401. A large number of resistive elements 404 are arranged in the thermal head 401 in a direction perpendicular to the feed direction of the sheet 403. The length of the region in which the resistive elements 404 are arranged is set to be substantially the same as the width of the sheet 403 on which an image is recorded. An ink film 405 is arranged between the sheet 40 guided by the platen roller 402 and the resistive elements 404. The ink film 405 is moved at the same velocity as the moving velocity of the sheet 403 in the same direction. The ink film 405 is constituted by a base film 406 and a color material layer 407 consisting of a sublimable ink.

When the resistive elements 40 of the thermal head 401 are energized, the resistive elements 404 generate heat. With this heat, the ink of the color material layer 407 of the ink film 405 is sublimated and adheres to an ink-receiving layer 408 of the sheet 403. With this adhesion of the ink, dots are printed on the sheet 403. An image is formed on the sheet 403 by a combination of these dots.

Figure 30:
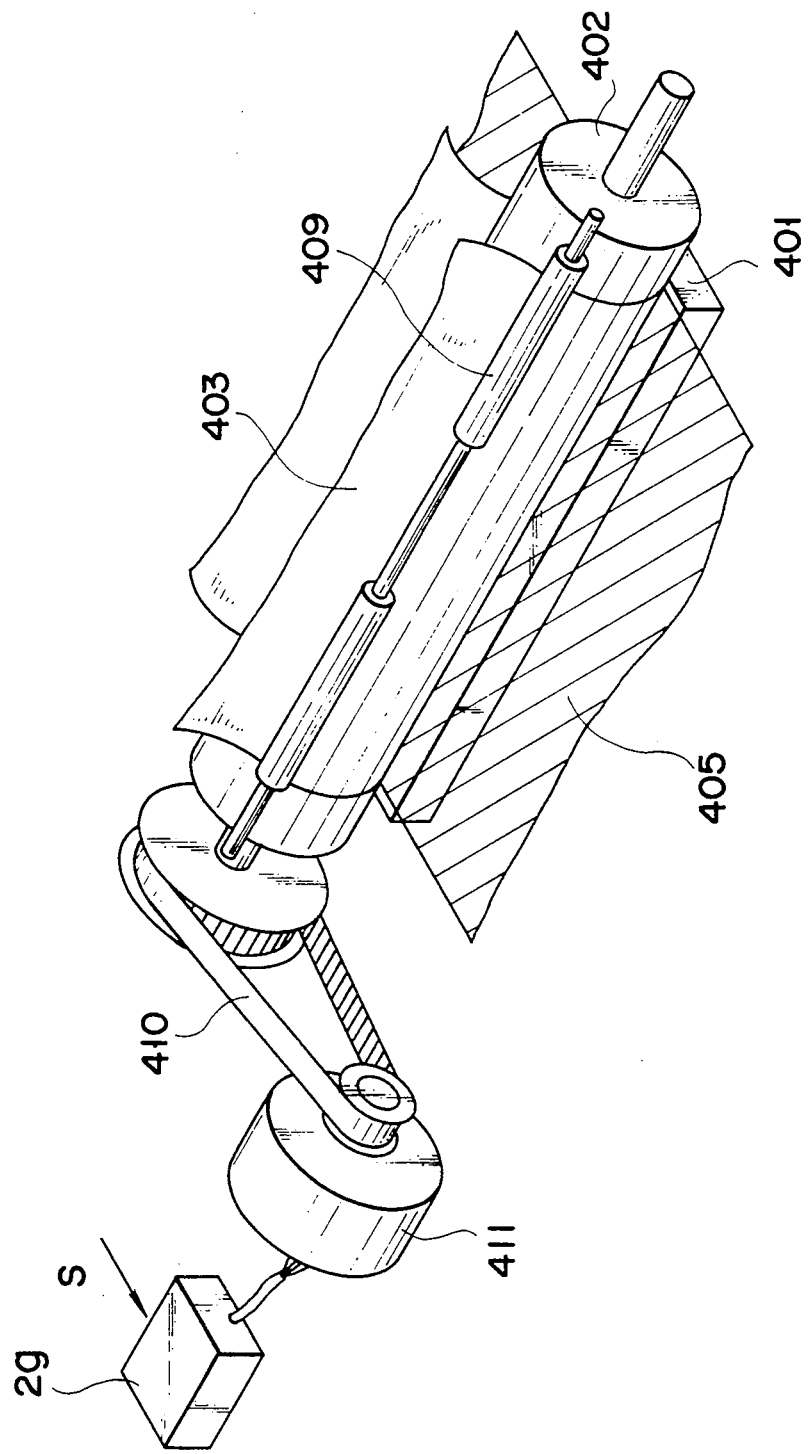
FIG. 30 is a view showing a platen roller drive system of the printer in FIG. 29.

As shown in FIG. 30, the sheet 403 is tightly held on the platen roller 402 by means of a pressure roller 409. The platen roller 402 is driven by a stepping motor 411 through a timing belt 410. In this embodiment, in order to shorten the time for image formation, the platen roller 402 is driven while the thermal head 401 is driven.

In the sublimation type thermal line printer having the above-described arrangement, since the drive frequency of the thermal head 401 is constant, if the rotation velocity of the platen roller 402 fluctuates, a printing position is deviated from a proper position to degrade image quality.

For this reason, in this embodiment, the stepping motor 411 is driven by a drive apparatus 2g. The drive apparatus 2g has substantially the same arrangement as that of the drive apparatus in FIG. 1. More specifically, the drive apparatus 2g is designed to cause the pulse rate of timing pulses for determining the excitation switching timings of the stepping motor 411 to fluctuate so as to coincide with the intrinsic velocity fluctuation period of a system including the stepping motor 411 and elements to be driven thereby and to have a phase substantially opposite to that of the intrinsic velocity fluctuation. In addition, the fluctuation amplitude of the pulse rate is optimally set.

With this arrangement, the intrinsic velocity fluctuation of the platen roller vibrating system and the velocity fluctuation caused by the pulse rate fluctuation can be controlled to have opposite phases and to cancel each other. Therefore, the velocity fluctuation of the stepping motor 411 can be satisfactorily reduced, and the platen roller 402 can be rotated almost at a constant velocity. This improves the image quality of a printed image.

In the above-described embodiment, the present invention is applied to the sublimation type line printer. However, the same effect can be obtained when the present invention is applied to thermal line printers of other systems, e.g., a hot-melt type line printer and a current-supply type line printer.

In addition, a stepping motor to which the present invention is applied is not limited in terms of the type and the number of phases. Furthermore, in the above embodiments, the intrinsic velocity fluctuation of each stepping motor includes only a single frequency component. However, the present invention can be applied to a stepping motor having an intrinsic velocity fluctuation including a plurality of frequency components as long as the frequencies are lower than the drive frequency of the stepping motor. Moreover, the present invention can be generally applied to mechatronic equipment incorporating steeping motors, including a system wherein the patient couch of a CT scanner is driven by a stepping motor.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A drive method of rotating a rotor of a stepping motor by sequentially switching/exciting a plurality of excitation windings of said stepping motor in a predetermined order, comprising the steps:

(a) determining periodic velocity fluctuation characteristics of at least said stepping motor;
   (b) storing periodic velocity fluctuation data determined in step (a) in a memory device; and
   (c) exciting said excitation windings while causing time intervals of sequential switching/excitation of said excitation windings to fluctuate in correspondence with the periodic velocity fluctuation data stored in the memory device.

2. A method according to claim 1, wherein the step (a) comprises the step of obtaining periodic velocity fluctuation characteristics of a system including said stepping motor and a load connected thereto.

3. A method according to claim 1, wherein the step (c) comprises the step of determining excitation switching timings of said excitation windings o the basis of a pulse train, and causing a pulse rate of the pulse train to fluctuate so as to have a phase opposite to that of the periodic velocity fluctuation obtained in the step (a).

4. A method according to claim 3, wherein the step (c) comprises the step of determining a fluctuation amplitude of the pulse rate in correspondence with a fluctuation amplitude of the periodic velocity fluctuation.

5. A method according to claim 3, wherein the step (c) comprises the step of using a microstep excitation method in which a current to be applied to each of said excitation windings is increased/decreased stepwise.

6. A drive method of rotating a rotor of a stepping motor by sequentially switching/exciting a plurality of excitation windings of said stepping motor in a predetermined order, comprising the steps of:

(a) obtaining periodic velocity fluctuation characteristics of at least said stepping motor;

(b) obtaining current values of said excitation windings which reduce the periodic velocity fluctuation obtained in the step (a);

(c) obtaining periodic velocity fluctuation characteristics of said stepping motor while said excitation windings are sequentially switched and excited by the current values obtained in the step (b);

(d) storing periodic velocity fluctuation data obtained in step (c) in a memory device; and (e) exciting said excitation windings by using the current values obtained in the step (b) while causing time intervals in which said excitation windings are sequentially switched/excited to fluctuate in correspondence with the periodic velocity fluctuation data stored in the memory device.

7. A method according to claim 6, wherein the step (e) comprises the step of determining excitation switching timings of said excitation windings, and causing a pulse rate of the pulse train to fluctuate so as to have a phase opposite to that of the periodic velocity fluctuation obtained in the step (c).

8. A method according to claim 7, wherein the step (e) comprises the step of determining a fluctuation amplitude of the pulse rate in correspondence with a fluctuation amplitude of the periodic velocity fluctuation obtained in the step (c).

9. A method according to claim 6, wherein the step (e) comprises the step of using a microstep excitation method in which a current to be applied to each of said excitation windings is increased/decreased stepwise.

10. A drive apparatus for switching/exciting a plurality of excitation windings of a stepping motor in a predetermined order, comprising:

a DC power source for supplying exciting currents to said plurality of excitation windings;

switching means arranged between said DC power source and said plurality of excitation windings, said switching means including a plurality of switching elements;

pulse generating means for generating a pulse train used as timing pulses for switching said plurality of excitation windings;

means for receiving the pulse train generated by said pulse generating means and ON/OFF-controlling said switching elements of said switching means in a predetermined order;

memory means for storing periodic velocity fluctuation data of at least said stepping motor; and means for reading out the velocity fluctuation data stored in said memory means, and causing a pulse rate of the timing pulses generated by said pulse generating means to fluctuate in correspondence with the velocity fluctuation data.

11. An apparatus according to claim 10, wherein said memory means stores periodic velocity fluctuation data of a system including said stepping motor and a load connected thereto.

12. An apparatus according to claim 10, wherein said means for causing the pulse rate to fluctuate causes the pulse rate of the timing pulses to have a phase opposite to that of velocity fluctuation obtained from the velocity fluctuation data stored in said memory means.

13. An apparatus according to claim 12, wherein said means for causing the pulse rate to fluctuate causes the pulse rate of the timing pulses to fluctuate in correspondence with amplitudes of velocity fluctuation obtained from the velocity fluctuation data stored in said memory means.

14. A drive apparatus for switching/exciting a plurality of excitation windings of a stepping motor in a predetermined order, comprising:

a DC power source for supplying exciting currents to said plurality of excitation windings;

switching means arranged between said DC power source and said plurality of excitation windings, said switching means including a plurality of switching elements;

pulse generating means for generating a pulse train used as timing pulses for switching said plurality of excitation windings;

means for receiving the pulse train generated by said pulse generating means and ON/OFF-controlling said switching elements of said switching means in a predetermined order;

current adjusting means for adjusting currents flowing in said plurality of excitation windings so as to reduce periodic velocity fluctuation of at least said stepping motor;

memory means for storing periodic velocity fluctuation data of said stepping motor which is obtained while the currents flowing in said plurality of excitation windings are adjusted by said current adjusting means; and means for reading out the velocity fluctuation data stored in said memory means, and causing a pulse rate of the timing pulses generated by said pulse generating means to fluctuate in correspondence with the readout velocity fluctuation data.

15. An apparatus according to claim 14, wherein said memory means stores periodic velocity fluctuation data of a system including said stepping motor and a load connected thereto.

16. An apparatus according to claim 14, wherein said means for causing the pulse rate to fluctuate causes the pulse rate of the timing pulses to have a phase opposite to that of velocity fluctuation obtained from the velocity fluctuation data stored in said memory means.

17. An apparatus according to claim 16, wherein said means for causing the pulse rate to fluctuate causes the pulse rate of the timing pulses to fluctuate in correspondence with amplitudes of velocity fluctuation obtained from the velocity fluctuation data stored in said memory means.

18. A drive apparatus for switching/exciting a plurality of excitation windings of a stepping motor in a predetermined order, comprising:

a DC power source for supplying exciting currents to said plurality of excitation windings;

switching means arranged between said DC power source and said plurality of excitation windings, said switching means including a plurality of switching elements;

pulse generating means for generating a pulse train used as timing pulses for switching excitation of said plurality of excitation windings and increasing/decreasing levels of exciting currents of said plurality of excitation windings in a stepwise manner;

means for receiving the pulse train generated by said pulse generating means, and switching/exciting said plurality of excitation windings by ON/OFF-controlling said switching elements of said switching means in a predetermined order;

means for receiving the pulse train generated by said pulse generating means, and increasing/decreasing levels of exciting currents flowing in said plurality of excitation windings in a stepwise manner;

current adjusting means for increasing/decreasing levels of exciting currents flowing in said plurality of excitation windings so as to reduce periodic velocity fluctuation of said stepping motor;

memory means for storing periodic velocity fluctuation data of said stepping motor which is obtained while the currents flowing in said plurality of excitation windings are adjusted by said current adjusting means; and means for reading out the velocity fluctuation data stored in said memory means, and causing a pulse rate of the timing pulses generated by said pulse generating means to fluctuate in correspondence with the readout velocity fluctuation data.

19. An apparatus according to claim 18, wherein said memory means stores periodic velocity fluctuation data of a system including said stepping motor and a load connected thereto.

20. An apparatus according to claim 18, wherein said means for causing the pulse rate to fluctuate causes the pulse rate of the timing pulses to have a phase opposite to that of velocity fluctuation obtained from the velocity fluctuation data stored in said memory means.

21. An apparatus according to claim 20, wherein said mean for causing the pulse rate to fluctuate causes the pulse rate of the timing pulses to fluctuate in correspondence with amplitude fluctuation of velocity fluctuation obtained from the velocity fluctuation data stored in said memory means.

* * * * *